US012586266B1

(12) United States Patent　　(10) Patent No.: US 12,586,266 B1
　　　Khan　　　　　　　　　　　　(45) Date of Patent: Mar. 24, 2026

(54) SYSTEM AND METHOD FOR TRANSFORMING AI CONTENT INTO FORMATTED DATASET FOR VISUAL DISPLAY

(71) Applicant: Dojoit, Inc., San Jose, CA (US)

(72) Inventor: Tawhid Khan, San Jose, CA (US)

(73) Assignee: Dojoit, Inc, San Jose, CA (US)

( * ) Notice: Subject to any disclaimer, the term of this patent is extended or adjusted under 35 U.S.C. 154(b) by 206 days.

(21) Appl. No.: 18/415,302

(22) Filed: Jan. 17, 2024

Related U.S. Application Data

(60) Provisional application No. 63/439,515, filed on Jan. 17, 2023.

(51) Int. Cl.
　　*G06T 11/20*　　　(2026.01)
　　*G06F 40/166*　　(2020.01)
　　*G06T 11/00*　　　(2026.01)
　　*G06T 11/10*　　　(2026.01)
　　*G06T 11/23*　　　(2026.01)

(52) U.S. Cl.
　　CPC ............ *G06T 11/23* (2026.01); *G06F 40/166* (2020.01); *G06T 11/10* (2026.01)

(58) Field of Classification Search
　　CPC ..... G06T 11/203; G06T 11/001; G06F 40/166
　　See application file for complete search history.

(56) References Cited

U.S. PATENT DOCUMENTS

| | | | |
|---|---|---|---|
| 2018/0300291 A1* | 10/2018 | Lee | G06F 40/205 |
| 2021/0374603 A1* | 12/2021 | Xia | G06N 3/045 |
| 2023/0351102 A1* | 11/2023 | Tran | G06N 20/00 |

OTHER PUBLICATIONS

Nodus Labs "Develop Your Ideas with GPT-3 AI and Text Visualization", youtube link "https://www.youtube.com/watch?v=fWG7oBdriXo", Dec. 11, 2022 (Year: 2022).*
OUseful. Info, the blog, "Generating Diagrams from Text Generated by ChatGPT", Dec. 12, 2022 (Year: 2022).*
W3C DrawML Specification "DrawML, Markup for Scalable and Intelligent Drawings", Dec. 3, 1998 (Year: 1998).*
Treehouse Community, "Why Hashtag in CSS Selector", May 4, 2016 (Year: 2016).*
Stack Overflow, "html—How to get icons on top of the text", Mar., 5, 2021 (Year: 2021).*
Stack Overflow, "How can I convert from string to emoji in typescript/javascript", Aug. 11, 2018 (Year: 2018).*
Zhiyue, "Draw A Sticky Note Using HTML and CSS", Jul. 11, 2019 (Year: 2019).*

* cited by examiner

*Primary Examiner* — Kee M Tung
*Assistant Examiner* — Xiaoming Wei
(74) *Attorney, Agent, or Firm* — Goodwin Procter LLP

(57) ABSTRACT

A method and system for manipulating visual effects in a drawing or art software application are provided. The method includes receiving a user input initiated by a user on a canvas of the drawing or art software application, the user input including a request for creating a text or non-text object; detecting a presence of one of a predefined set of commands in the user input; determining one or more of a type, subject, and content for a to-be-created object by examining the detected command and one or more words before the detected command; and automatically creating the text or non-text object corresponding to the determined one or more of a type, subject, and content without requiring the user to select a text or drawing tool from tool sections of the drawing or art software application.

14 Claims, 17 Drawing Sheets

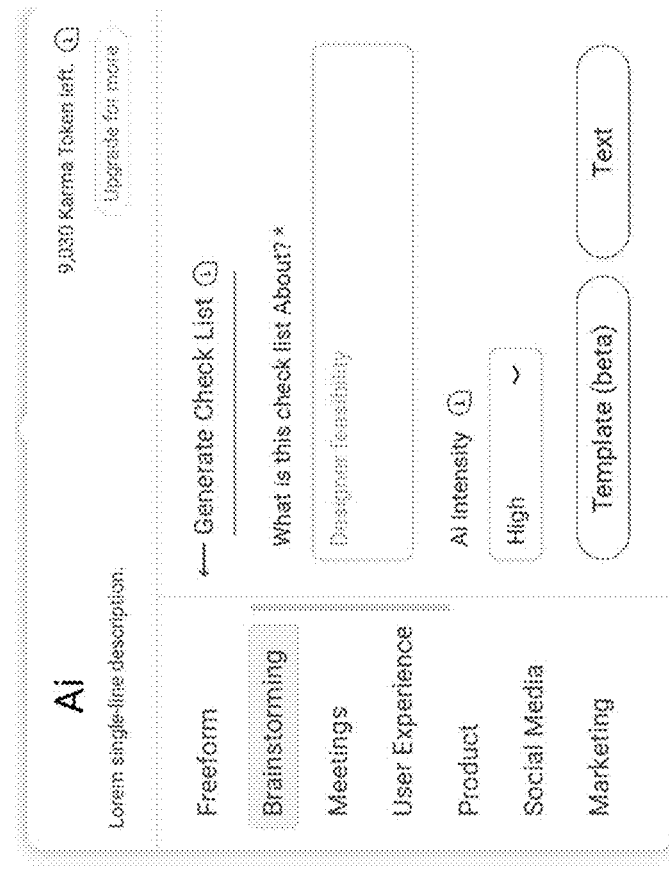
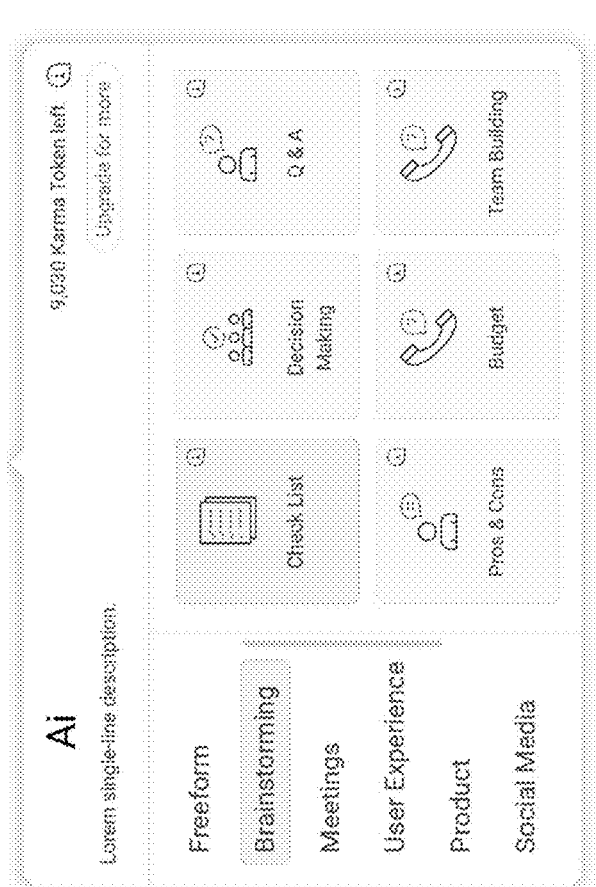
FIG. 8

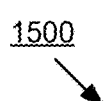

1500

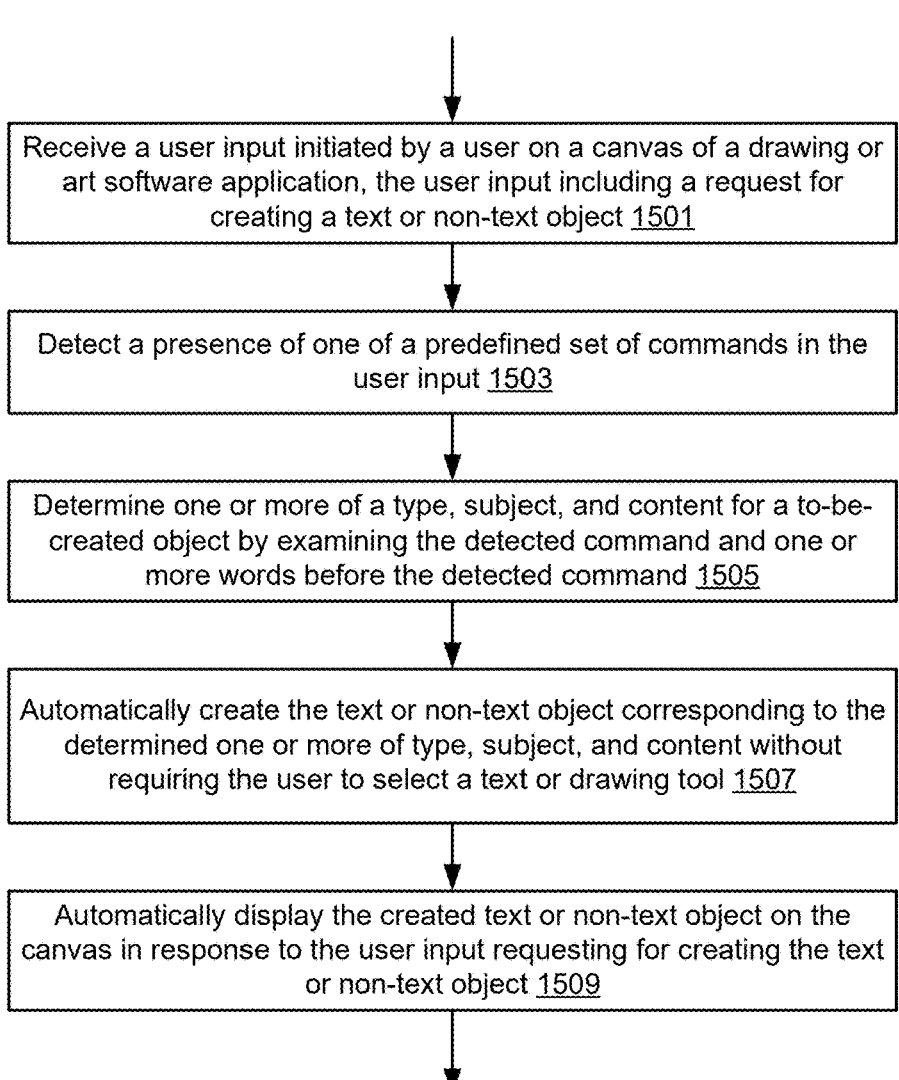

Receive a user input initiated by a user on a canvas of a drawing or art software application, the user input including a request for creating a text or non-text object 1501

Detect a presence of one of a predefined set of commands in the user input 1503

Determine one or more of a type, subject, and content for a to-be-created object by examining the detected command and one or more words before the detected command 1505

Automatically create the text or non-text object corresponding to the determined one or more of type, subject, and content without requiring the user to select a text or drawing tool 1507

Automatically display the created text or non-text object on the canvas in response to the user input requesting for creating the text or non-text object 1509

FIG. 15

Docket No. DOJ-002US
1600
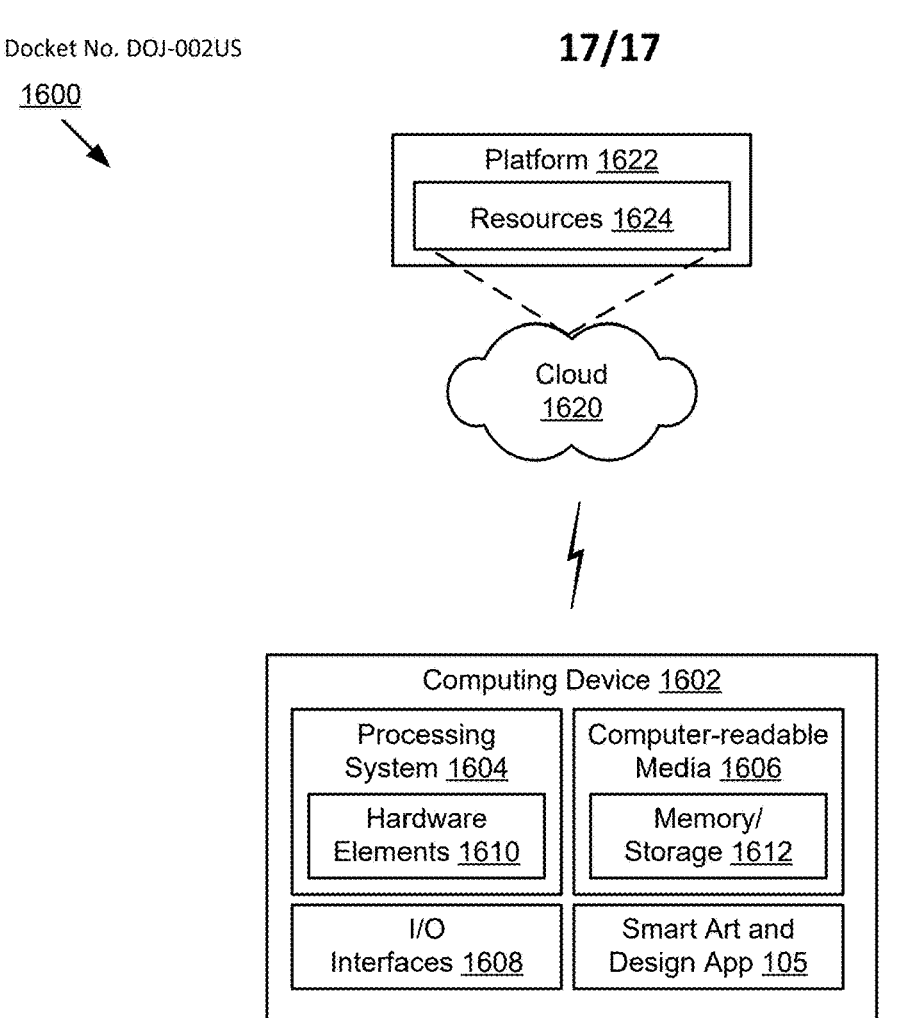
Platform 1622
Resources 1624
Cloud
1620
Computing Device 1602
Processing
System 1604
Hardware
Elements 1610
Computer-readable
Media 1606
Memory/
Storage 1612
I/O
Interfaces 1608
Smart Art and
Design App 105
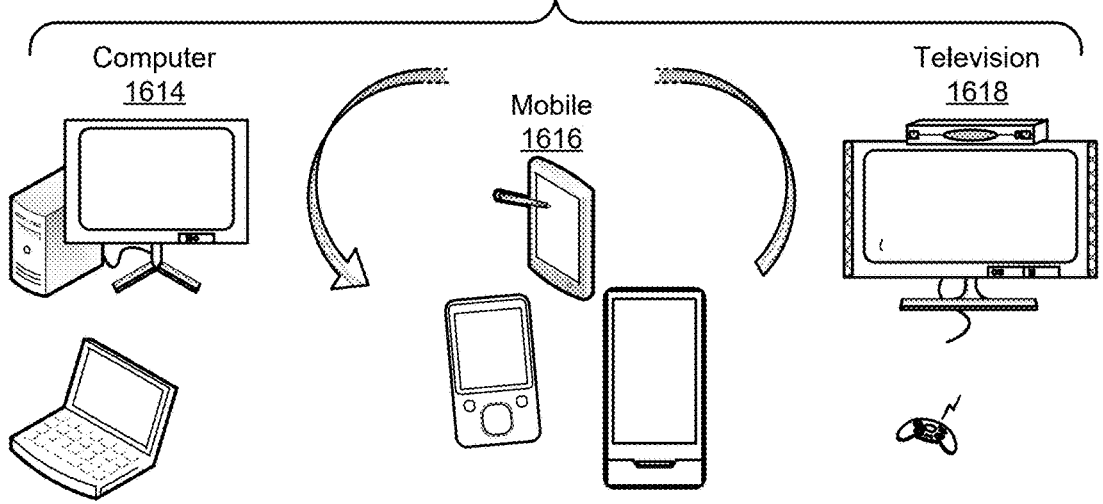
Computer
1614
Mobile
1616
Television
1618
FIG. 16

SYSTEM AND METHOD FOR TRANSFORMING AI CONTENT INTO FORMATTED DATASET FOR VISUAL DISPLAY

CROSS-REFERENCE TO RELATED APPLICATION

The application claims priority of U.S. provisional application No. 63/439,515 filed Jan. 17, 2023, which is hereby incorporated by reference in its entirety.

TECHNICAL FIELD

The present disclosure relates to visual display technology, and in particular to systems and methods for transforming digital content into formatted datasets for visual display in a drawing or art software application.

BACKGROUND

In current drawing or art software applications, many different drawing and text tools are provided, to allow users to create and edit text objects (e.g., words, sentences, paragraphs, symbols, etc.) and non-text objects (e.g., lines, arrows, circles, squares, images, etc.) in different formats and/or with different visual effects. While these different tools facilitate users in content creation and manipulation, they also require users to frequently toggle between tools and objects or between different objects. Imaging a creation of a drawing or art project with certain non-text objects and text objects and various combinations thereof, for example, a shape containing certain text, current drawing or art software applications require a user to first select a shape from a shape section of the drawing or art software application, next move a mouse to a target location to create a shape, and then type text into the created shape. This creates a number of back-and-forth mouse movements. If considering that the real number of text and non-text objects and their combinations in a drawing or art project may be much larger, and how many drawing or art projects are to be accomplished by users using the drawing or art software applications, the time required for moving the mouse between drawing tools and different types of objects may be quite demanding, which unavoidably lowers productivity and increases time to complete drawing or art projects, thereby slowing down the efficient use of these drawing or art software applications. Additionally, many drawing or art applications require users to type certain text in the created text or non-text objects, which further slows down the efficient use of these drawing or art software applications.

SUMMARY

To address the aforementioned shortcomings, a method and system for manipulating visual effects in a drawing or art software application are provided. The method includes receiving a user input initiated by a user on a canvas of the drawing or art software application, the user input including a request for creating a text or non-text object; detecting a presence of one of a predefined set of commands in the user input; determining one or more of a type, subject, and content for a to-be-created object by examining the detected command and one or more words before the detected command; and automatically creating the text or non-text object corresponding to the determined one or more of a type, subject, and content without requiring the user to select a text or drawing tool from tool sections of the drawing or art software application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 8 illustrates example user interfaces for inputting user inputs for dynamic template design, according to some embodiments.

FIG. 15 illustrates an example method for generating a visual display in response to a user request, according to some embodiments.

FIG. 16 is a functional block diagram of an example computer system upon which aspects of this disclosure may be implemented, according to some embodiments.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high level, without detail, in order to avoid unnecessarily obscuring aspects of the present teachings.

To solve the aforementioned problems and certain other problems in the existing drawing or art software applications, the present disclosure provides a method and system that use a set of smart commands and visual information designs that facilitate users to create certain text or non-text objects and create certain text, templates, wireframes, diagrams, or many other types of text or non-text objects without necessarily requiring users to move between the tool/shape sections and a whiteboard in visual effect manipulation. In some embodiments, besides automatically creating certain text and/or non-text related objects, the disclosed method and system even apply certain artificial intelligence to automatically generate and/or input certain text without requiring users to specifically type such text into whiteboards, all of which facilitate users in the preparation of text or non-text drawing or art projects.

Given the high frequency of creation and/or visual effect manipulation of text or non-text objects in drawing or art projects, even small individual efficiencies, fewer switches or toggles, and more natural gestures yield significant aggregate value. The technical solution, therefore, shows an improvement in the functioning of computers, particularly those with a drawing or art software application for frequent text and non-text object creation, editing, visual effect manipulation, etc.

It is to be noted that the benefits and advantages described herein are not all-inclusive, and many additional features and advantages will be further described under the context of specific embodiments. In addition, some additional features and advantages will become apparent to one of ordinary skill in the art in view of the figures and the following descriptions.

Figure 1:
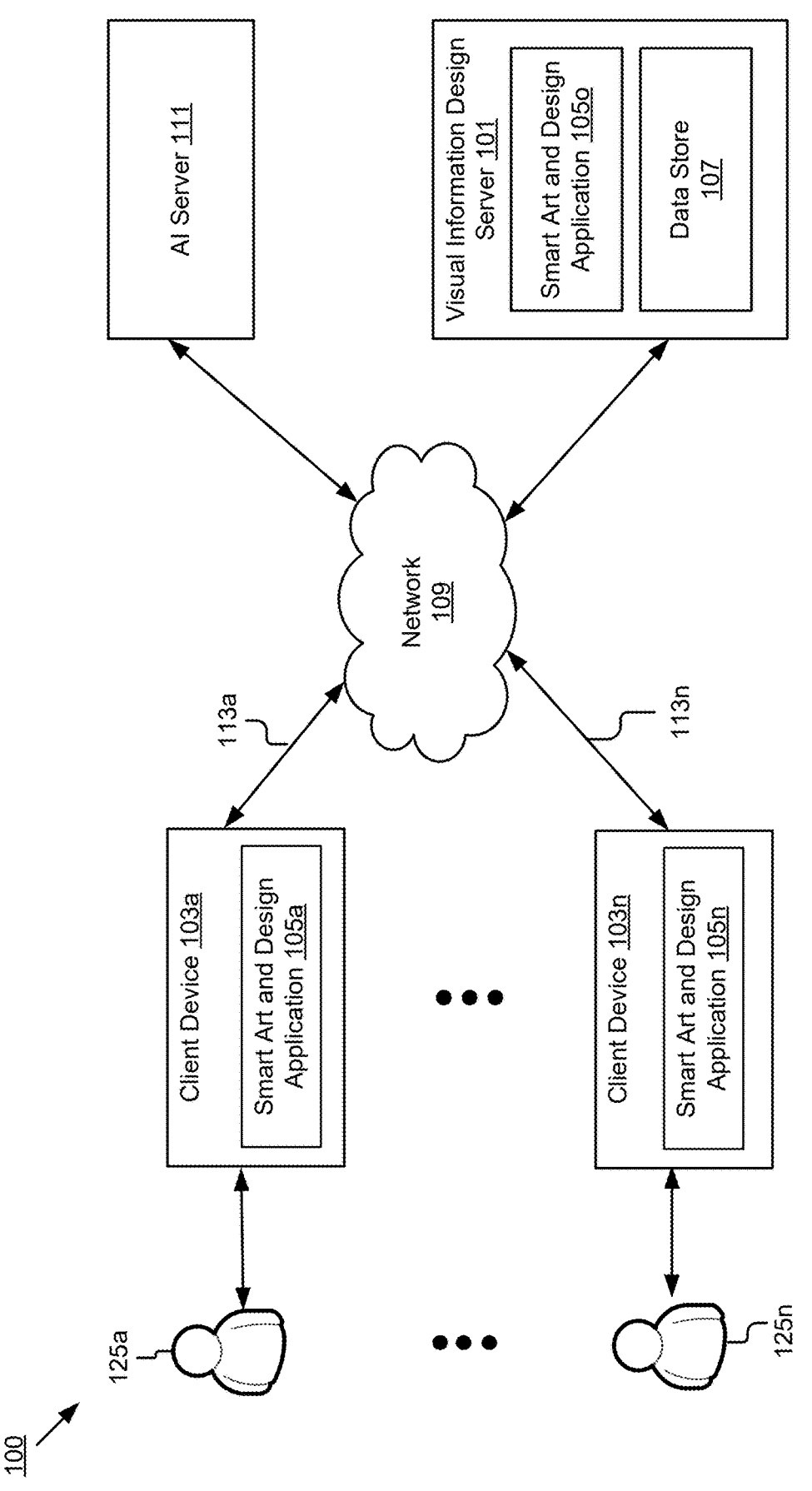
FIG. 1 illustrates a block diagram of an example visual information design system, according to some embodiments.

FIG. 1 is a block diagram of an example visual information design system 100. As illustrated, the system 100 includes one or more client devices 103a . . . 103n, where each client device includes a respective smart art and design application 105a or 105n. Optionally, the visual information design system 100 may further include a visual information design server 101 communicatively coupled to the one or more client devices 103a . . . 103n via a network 109. A smart art and design application 1050 may also be included in the visual information design server 101. In addition, to enable automatic text input, the disclosed visual information design system 100 may further include an artificial intelligence (AI) server 111 that is configured to automatically acquire certain text and non-text content for visual display. It is to be noted that FIG. 1 is provided by way of example and the system 100 and/or further systems contemplated by the present disclosure may include additional and/or fewer components, may combine components and/or divide one or more of the components into additional components, etc. For example, the system 100 may include any number of visual information design servers 101, client devices 103a . . . 103n, or networks 109.

The network 109 may be a conventional type, wired and/or wireless, and may have numerous different configurations, including a star configuration, token ring configuration, or other configurations. For instance, the network 109 may include one or more local area networks (LAN), wide area networks (WAN) (e.g., the Internet), public networks, private networks, virtual networks, mesh networks, peer-to-peer networks, and/or other interconnected data paths across which multiple devices may communicate. The network 109 may also be coupled to or include portions of a telecommunications network for sending data in a variety of different communication protocols. In some embodiments, the network 109 includes Bluetooth® communication networks or a cellular communications network for sending and receiving data including via short messaging service (SMS), multimedia messaging service (MMS), hypertext transfer protocol (HTTP), direct data connection, wireless application protocol (WAP), email, etc.

The client devices 103a . . . 103n (or collectively client device 103) may include virtual or physical computer processors, memor(ies), communication interface(s)/device(s), etc., which, along with other components of the client device 103, are coupled to the network 109 via signal lines 113a . . . 113n for communication with other entities of the system 100. In some embodiments, the client device 103a . . . 103n, accessed by users 125a . . . 125n via input interfaces respectively, may send and receive data to and from other client devices(s) 103 and/or the visual information design server 101, and may further analyze and process the data. For example, the client devices 103a . . . 103n may communicate with the visual information design server 101 to transmit certain user inputs including certain commands, keywords, and/or parameters for text and non-text object creation. The visual information design server 101 may analyze the user inputs to identify the commands, keywords, and parameters included therein, so as to generate certain text and/or non-text objects organized in a specific way for presenting to the client devices 103. Non-limiting examples of client device 103 may include a laptop computer, a desktop computer, a tablet computer, a mobile telephone, a personal digital assistant (PDA), a mobile email device, or any other electronic device capable of implementing drawing or art software applications.

In some embodiments, the client devices 103a . . . 103n include instances of smart art and design application 105a . . . 105n (or collectively smart art and design application 105). The smart art and design application 105 is representative of functionality relating to drawing and art projects, such as the creation of text and non-text objects and visual effect manipulation of the created text and non-text objects. For example, the smart art and design application 105 may include a set of drawing tools, a set of editing tools, and a set of text tools, where each set of tools may include tools for specific functions in creating and manipulating text and non-text objects.

In some embodiments, besides these different tools, the smart art and design application 105 disclosed herein may be further configured to include certain commands for facilitating text and non-text object creation and visual effect manipulation. For example, certain commands for text input may be included in the smart art and design application 105, which allows certain text content to be automatically generated and input into a whiteboard (e.g., through cooperation with AI server 111), without requiring a user to type specific texts. For another example, certain commands for shape creation may be included in the smart art and design application 105, which allows a variety of shapes (such as a triangle, square, circle, and so on) to be automatically created and input into a whiteboard. Additional commands may include but are not limited to commands for automatic visual manipulation of text in a specific way, such as arranging text in a diagram format, a template format, a wireframe format, etc. The specific functions of the smart art and design application 105 are further described in detail below in FIG. 2.

In some embodiments, the visual information design server 101 may be configured to implement partial or all functions disclosed herein. For example, the visual information design server 101 may include an instance of smart art and design application 1050 (may be also referred to as smart art and design application 105) for text and non-text object creation and visual effect manipulation. In some embodiments, more complication operations requiring a relatively large computation capacity (e.g., creation of diagrams) may be implemented in the visual information design server 101 while some simpler operations (e.g., creating a shape) may be implemented locally on a client device 103 without necessarily communicating with the visual information design server 101.

In some embodiments, the disclosed system may further include or may be coupled to, an AI server 111 configured to automatically provide text and non-text content for a user query, for example, in response to a question ending with a content command, as will be described in detail later. In some embodiments, the AI server 111 may be coupled to a third-party service provider (e.g., OpenAI®) that automatically generates responses to user queries.

In some embodiments, the disclosed visual information design system 100 may further include a data store 107 configured to store data generated and/or required during the creation and visual effect manipulation of text and non-text objects. The data store 107 may be included in the visual information design server 101 as illustrated in FIG. 1, or may be an independent data storage facility or a cloud-based storage facility, which is not limited in the disclosure.

Figure 2:
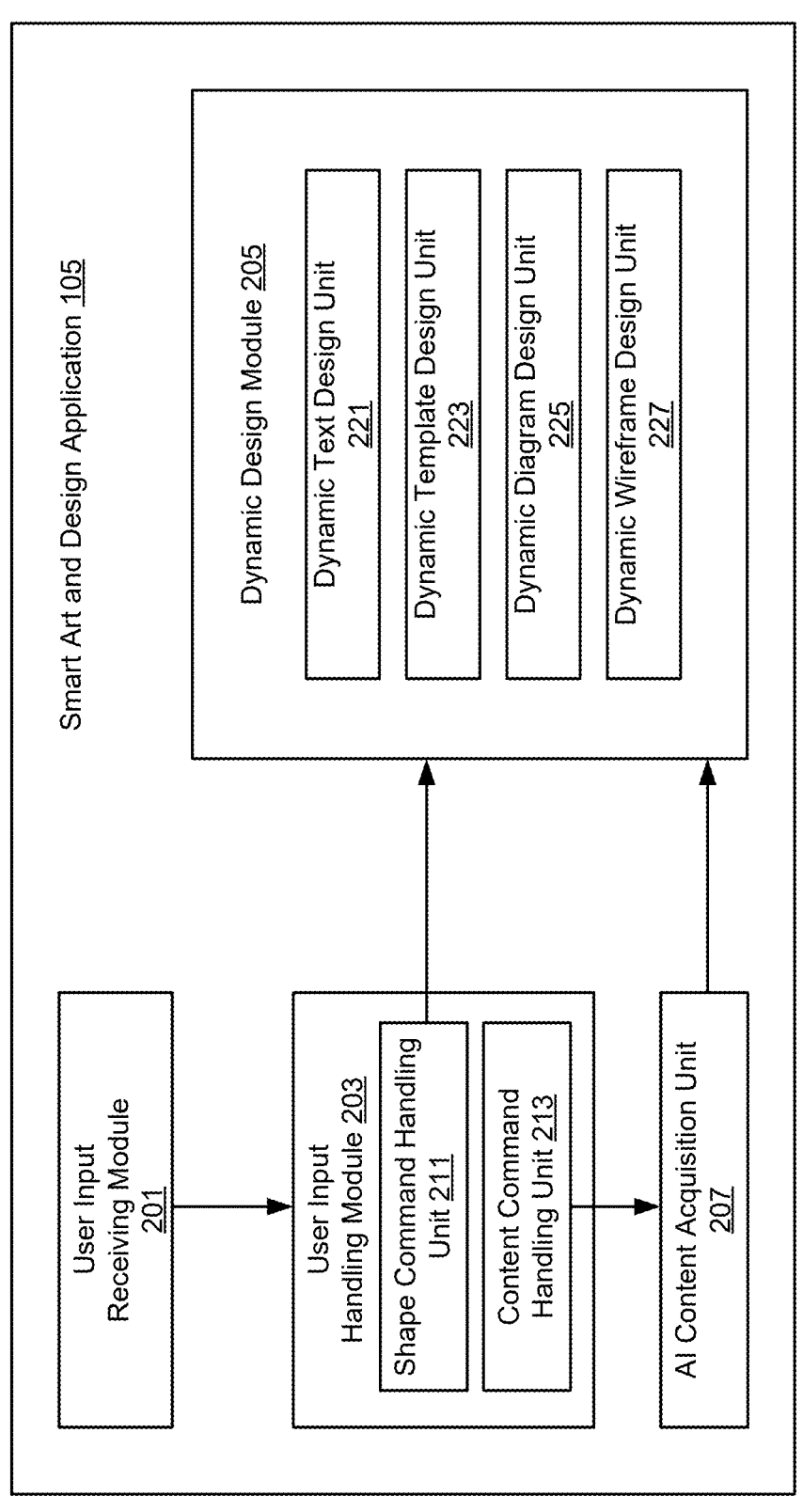
FIG. 2 illustrates a block diagram of example modules of a visual information design system shown in FIG. 1, according to some embodiments.

Referring now to FIG. 2, specific functions of the smart art and design application are further described. As illustrated in the figure, an instance of smart art and design application 105 may include a user input receiving module 201, a user input handling module 203, and a dynamic design module 205. In some embodiments, the smart art and design application 105 may optionally include an AI content acquisition module 207.

The user input receiving module 201 may receive user inputs through one or more user interfaces. For example, the disclosed smart art and design application 105 may include a whiteboard for creating and visually displaying text and non-text objects in a drawing or art project. During the project, a user may input text through certain text tools included therein or may draw a shape or a diagram through certain drawing tools included therein. The user input receiving module 201 may receive these user inputs and display the corresponding text and non-text content based on the user inputs. In some embodiments, the user inputs may further include certain commands in predefined formats, which may trigger the smart art and design application to automatically generate certain text and non-text objects without using text and drawing tools.

The user input handling module 203 may be configured to handle the received user inputs. For example, for the user inputs that include certain commands, the user input handling module 203 may be configured to generate unique text and non-text objects corresponding to these commands. According to one embodiment, the visual information design system 100 may include a set of predefined smart content commands that allow content (e.g., text, image, video, etc.) to be automatically generated, created, and/or retrieved for a drawing or art project, or for other types of projects (e.g., in a word file if the disclosed method is integrated into a third party application, for example, as an add-on). In one example, a smart content command such as "/ai" may trigger automatic creation of certain content that can be placed onto an online whiteboard. The auto-created content may relate to the text preceding the smart command. For example, the auto-created content may be a response to a question or instruction typed preceding the command. In some embodiments, the user input handling module 203 may include a content command handling unit 213 configured to handle such user requests. In some embodiments, the content command handling unit 213 may communicate with an online AI content acquisition unit 207 to obtain the corresponding content.

Figure 3:
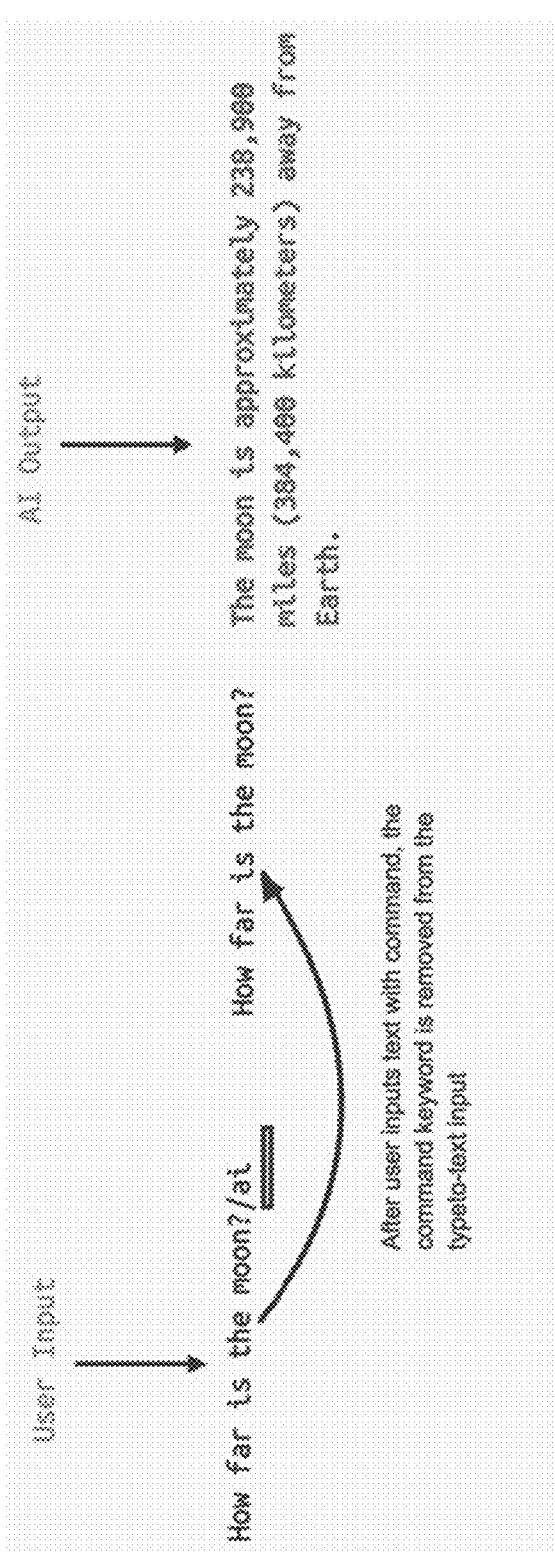
FIG. 3 illustrates an example auto-creation of certain text based on a smart content command, according to some embodiments.

FIG. 3 illustrates an example auto-creation of certain text based on a smart content command. As illustrated, the smart command is a "/ai" command, which follows a question typed preceding the command. The question asks about the distance of the moon. When the smart content command is typed, the corresponding text can be automatically generated and displayed on the whiteboard as illustrated in FIG. 3. For example, the automatically generated text is an answer to the question, which states that "The moon is approximately 238,85 miles (384,400 kilometers) from Earth." As can be also seen from FIG. 3, after the command triggers the automatic generation of the text (e.g., the answer), the command itself may be automatically removed from the type-to-text input.

In some embodiments, the disclosed visual information design system 100 may additionally include a smart engine (e.g., an AI server 111 in FIG. 1) that can be configured to acquire the corresponding answer to a question or instruction (e.g., please provide a distance of the moon). The smart engine may be AI-supported, may be an online search engine, may be a service provided by a third party, or may be another different type of engine that can provide the proper content in response to the question or instruction. In some embodiments, the smart command may not only generate or create text as illustrated in FIG. 3, but also can trigger the creation of a non-text object, such as an image or video, or other types of objects. For example, if the text preceding the smart command asks to provide an image of the moon, the smart engine may automatically retrieve an image from an online source or another different source and place the image of the moon inside the whiteboard (e.g., next to the question or instruction). Depending on the text typed preceding the command and/or depending on the configurations, many different types of text or non-text objects can be automatically created, generated, or retrieved, and then placed on the whiteboard next to the typed question or instruction.

According to another embodiment, the disclosed visual information design system 100 may further include a set of smart commands that allows users to quickly create or draw certain shapes or icons onto an online whiteboard while typing text on a canvas. These smart commands may have a predefined format, which when typed correctly, may trigger an automatic creating or drawing of the predefined elements onto an online whiteboard, without requiring a user to manipulate specific drawing tools.

In one example, a smart command may be a forward slash "/," or another different symbol, followed by an alphanumeric key. Example commands may include but are not limited to certain shape commands such as "/circle" "/rectangle" "/oval" "/triangle" "/stickynote" "/arrow" "/art" "/emoji," and the like, which may allow to automatically create certain shapes (with or without text inside the created shapes), among others such as arrows, emojis, etc. If created with text, the text can be placed inside the created shapes without requiring users to type text inside the shapes. For example, while typing on a whiteboard (e.g., a canvas), forward slash "/" or other tools (/rectangle for rectangle, /circle for circle, /oval for oval, /triangle for triangle, /stickynote for sticky note) starting or tailing with an "Enter" key will trigger an automated drawing of the corresponding shapes or objects around a text. In some embodiments, the width of the shape may be determined by the width and height of the text object that it was triggered from. In some embodiments, the user input handling module 203 may include a shape command handling unit 211 configured to handle smart shape commands. It should be noted that shape commands disclosed herein are not limited to creating general shapes (such as a triangle, circle, and square), but rather can be used to create other non-text objects, such as images, icons, connectors, and so on, as will be described in detail below.

Figure 4:
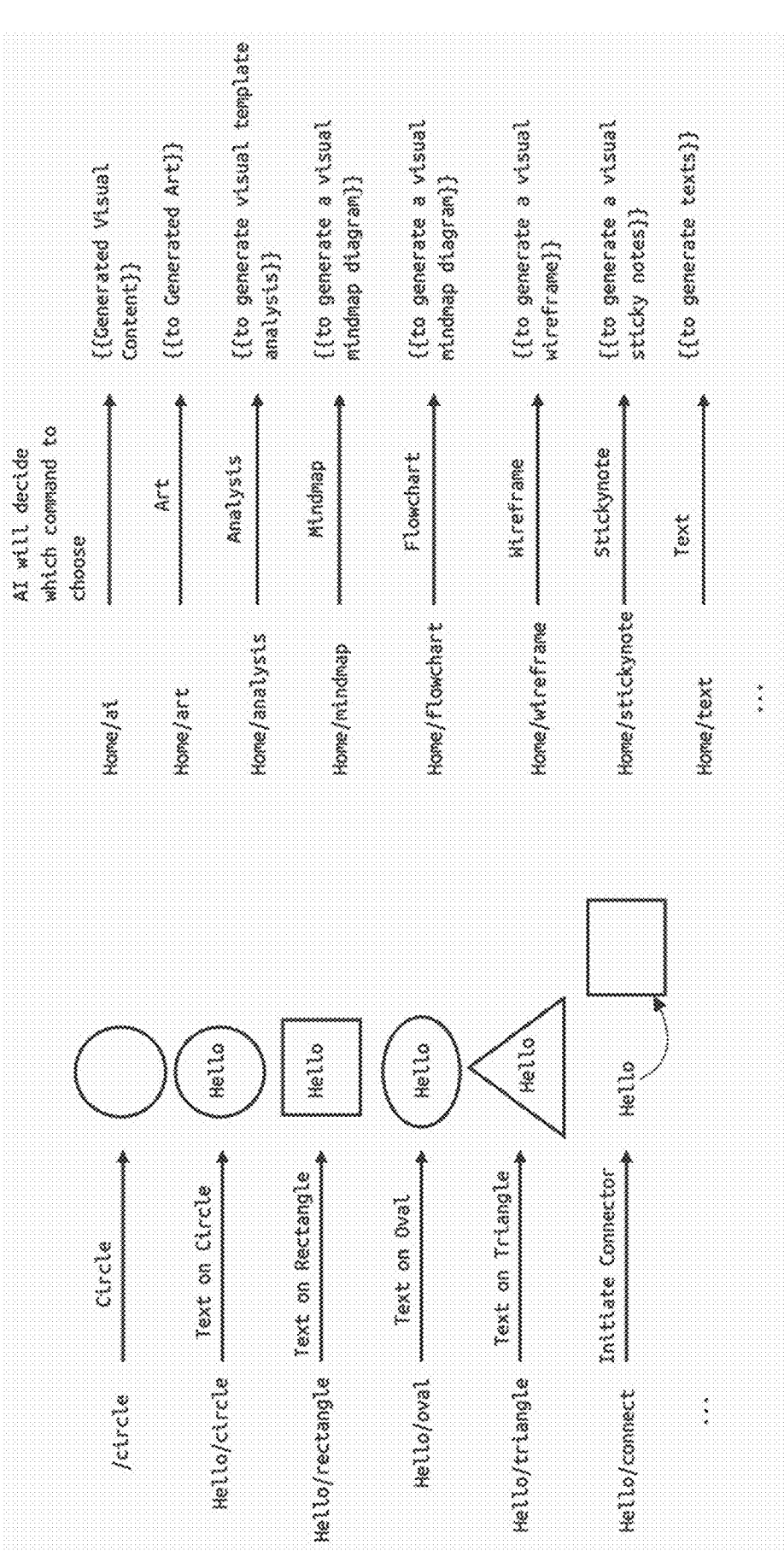
FIG. 4 illustrates some example smart shape commands and the corresponding automatically created various shapes or other objects, according to some embodiments.

FIG. 4 illustrates some example smart shape commands and the corresponding automatically created various shapes or other objects with or without text inside the shapes or objects. As can be seen in the figure, for a simple command "/circle" without text typed before the command, a circle can be automatically generated, where there is no text inside the created circle. However, if "Hello" is typed before "/circle," the text "Hello" can be automatically placed inside the created shape "circle." The "/rectangle" may indicate that a rectangular will be automatically created, "/oval" means that an oval will be automatically created, "/triangle" means that a triangular will be automatically generated, and "/stickynote" means a sticky note will be automatically generated. As can be seen in FIG. 4, the sticky note may have a shape and/or color that matches the sticky notes found in other existing applications. In real applications, the shape and color of the automatically created sticky note can be in different shapes and/or colors, depending on the configuration of the smart shape commands.

In some embodiments, when a text is typed before a smart shape command, the typed text is not always placed inside a shape created based on the specific smart shape command. For example, "Hello/connect" does not create an object that includes "Hello" inside the object. Instead, "/connect" is predefined to initiate a connector, and thus a connector is placed after the typed "Hello," where the automatically created connector is connected with the typed "Hello." In some embodiments, if there is another object (such as a rectangle as shown in FIG. 4) located next to the typed text (such as "Hello") in the drawing or art project, the automatically created connector may automatically set a connection before the text before the command and object next to the typed text. In some embodiments, a command may initiate more than one text or non-text object. For example, "/" followed by "connect to a rectangle" may initiate an automatic creation of a connector as well as a rectangle for the created connector to connect with.

Another example of a command that does not place typed text inside a created object is the command "/art." For example, "Home/art" does not create an object that includes "Home" inside the object. Instead, "art/" is predefined to initiate an image or icon that can be automatically created and placed over the text typed before the smart shape command (which can be also referred to as "smart art command").

In some embodiments, when a text is typed before a smart shape command, the typed text may be removed and replaced with an automated created shape, icon, or symbol. For example, "/emoji" is predefined to initiate an emoji symbol, which can replace the actual text typed before the smart command. For example, when typing "Hello/emoji," an emoji corresponding to "Hello" may be created in the place of the typed text "Hello" without necessarily showing the actual text "Hello" in the place. For another example, when typing "Like/emoji," an emoji corresponding to "Like" may be created in the place of the typed text "Like" without necessarily showing the actual text "Like" in the place.

It is to be noted that the smart shape commands and corresponding shapes or objects illustrated in FIG. 4 are merely for exemplary purposes, and not for limitations. For example, certain smart shape commands may trigger drawing (or text) tools to automatically appear at the mouse location, without requiring a user to toggle between the tool sections and an ongoing drawing or art project. For another example, certain smart commands may instead trigger certain visual display effect manipulation, such as displaying the text or non-text object in certain specific ways, such as mindmap (i.e., diagram), flowchart, wireframe, etc. In addition, certain smart commands may also trigger the processing of certain AI content triggered based on the text typed before the command, as will be described in detail later. For example, "/analysis" may cause an analysis of the AI response triggered by the types of text before the commands. From the above descriptions and from FIG. 4, it can be seen that there are a large variety of smart commands, which may be also combined with each other, making the smart commands disclosed herein a really power tool with much improved efficiency in the disclosed drawing and art application.

Here the following are some exemplary definitions that can be used to configure smart shape commands:

For general shape commands (e.g., "/rectangle" for rectangle, "/circle" for circle, "/oval" for oval, "/triangle" for triangle, etc.), created shapes may be placed around a text object.

For connector shape commands (e.g., "/line" for a line, "/arrow" for an arrow, etc.), the corresponding connector shape objects may be placed next to the text objects.

For image or icon command (e.g., "/icon"), an image or icon that matches the word that a user has entered may be placed on top of the word.

For emoji commands (e.g., "/emoji"), an emoji may automatically replace the word.

For drawing tool commands (e.g., "/pen" for pen, "/brush" for brush, etc.), the text input function may automatically switch to that drawing tool, which then allows users to draw using the tool without requiring a user to select tools from the drawing tool section.

For sticky note commands (e.g., "/stickynote"), text entered before the command may be converted to a sticky note.

For color commands, while typing, if the text is starting or trailing with "/[ColorName]," will select the defined color choice. Example color-related smart commands include but are not limited to "/Transparent," "/Black," "/Red," "/Brown," "/Blue," "/Orange," "/Purple," "/Green," "/Yellow," and "/White."

For user preset content features a user-customizable command function, denoted as "#[customCommand]," unique to each user. Preliminary commands include "#mycompany" or "#mybio." The unique identifier, such as "#mycompany," may stand for "XYZ Company Inc. A global coffee bean supplier." As the user types text incorporating their unique custom command, the system auto-populates the preset value. For instance, "Give me a SWOT Analysis for #mycompany" is converted to "Give me a SWOT Analysis for XYZ Company Inc." This then adds an additional level of customization and enhanced utility.

It is to be noted that after a "/" while using "Type to Text" (e.g., text inputting process) on canvas with the shortcut key, it will trigger action and remove the tailing "/[alphabets]," as described earlier with the smart content commands. That is, the typed "/[alphabets]" will automatically disappear once the proper action is triggered to complete.

In some embodiments, prior to utilizing the smart command, users may elect to apply one of their preset configurations to replicate a text or objects for their prompt in conjunction with such command. This can be accomplished by invoking their unique command language denoted by "#command." An illustrative example of this would be a user who has stored their corporate information using a command tagged as "mycompany," with the corresponding value set as "XYZ Company, XYZ Company, a distributor of coffee beans globally." In instances where the user inputs "SWOT Analysis for #mycompany," the resultant prompt for such command will be "SWOT Analysis for XYZ Company, XYZ Company, a distributor of coffee beans globally."

In some embodiments, besides the smart content and shape commands that can trigger automatic creation, generation, or retrieval of certain text or non-text objects, the smart art and design application 105 disclosed herein may provide a mechanism to automatically organize the display of certain text or non-text objects, and thus the system disclosed herein may be referred to as a visual information design system (VIDS), according to some embodiments. The automatically generated visual layout of the text or non-text objects can be in many different formats, such as templates, diagrams, flowcharts, wireframes, and the like, as will be described in detail below. In some embodiments, certain text may be also automatically created or generated during the visual layout of text and non-text objects.

To achieve the aforementioned functions, according to one embodiment, the VIDS system 100 is configured to create a structured dataset (e.g., by converting into JSON) for the specific visual layout from AI responses (i.e., content acquired from the AI engine) for the visual representation of the data (e.g., Templates, Diagrams, Wireframes, etc.). For example, the VIDS system 100 may combine various elements to transform AI responses (e.g., from GPT) into a specific JSON object, depending on the desired visual output.

Referring back to FIG. 2, in some embodiments, specific programs or modules (such as dynamic text design unit 221, dynamic template design unit 223, dynamic diagram design unit 225, dynamic wireframe design unit 227) are configured in the disclosed smart and art design application 105 to transform the AI content into a formatted dataset that can be used to generate various types of dynamic designs (also referred to as dynamic design systems (DDS)) for rendering visual information, such as text (DXDS), template (DTDS), diagram (DDDS), wireframe (DWDS), and so on. These programs or modules, once configured, allow to dynamically generate data representations (e.g., visual layouts) that are both meaningful and intellectually engaging.

Figure 5:
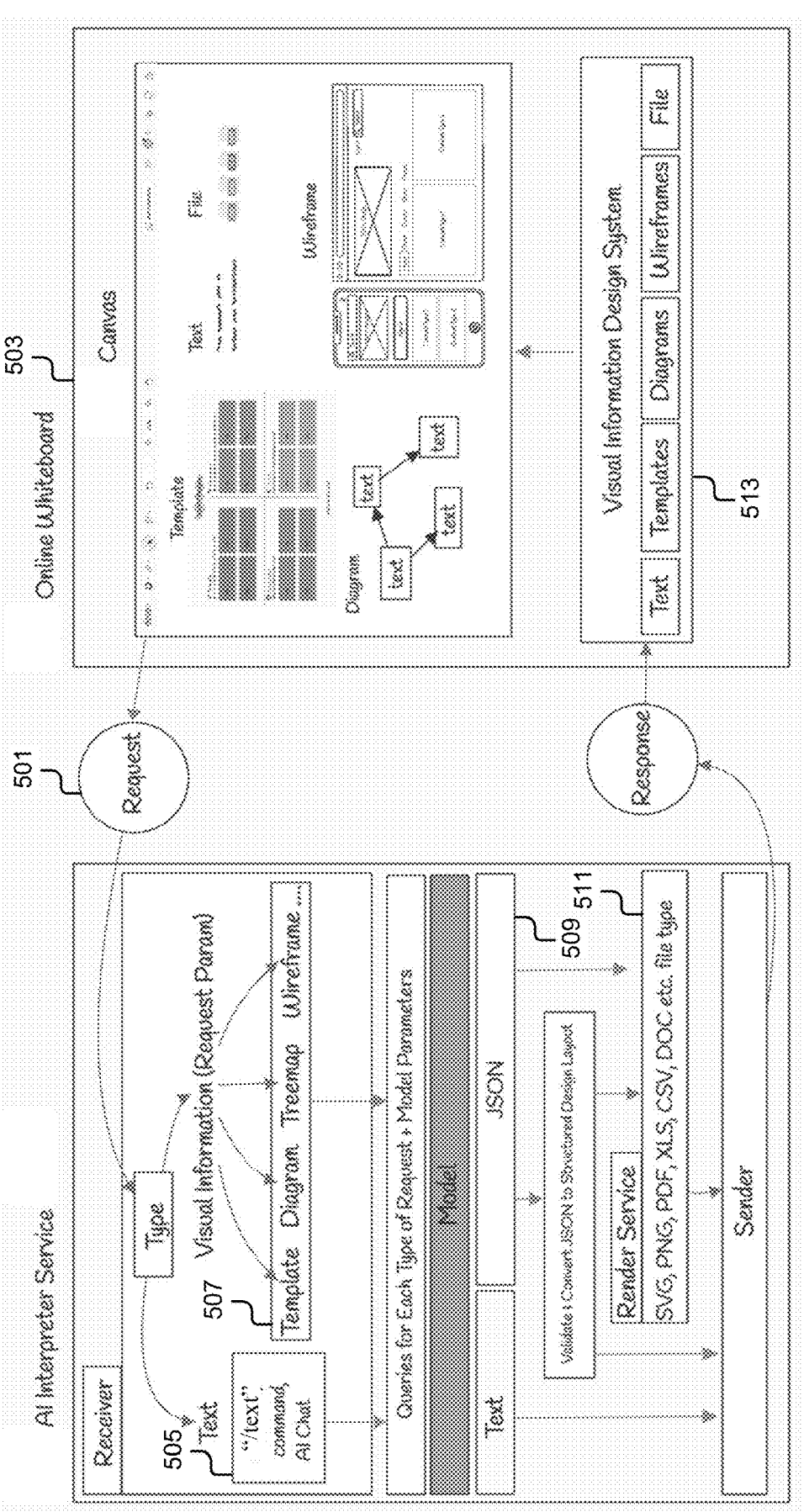
FIG. 5 illustrates an example process for generating dynamic visual information representations, according to some embodiments.

FIG. 5 illustrates an example process for generating dynamic visual information representations. As illustrated, the process may start with a user making a specific AI content request(s) from a self-configured online whiteboard 503 or from external services. The request can be for simple text returns (e.g., through smart content command "/text") as indicated by block 505 and/or can be layout-based (e.g., template, diagram, tree-map, wireframe, etc.) responses, as indicated by block 507 in FIG. 5. In some embodiments, for layout-based requests, certain model parameters may be submitted together with the request as part of the queries.

In some embodiments, the smart AI engine included in or coupled to the VIDS system 100 may respond to the content queries by collecting the corresponding AI content related to the request. For the collected text, it may be rendered for display without additional actions. However, for the AI content related to the layout-based responses, the unstructured content may be first converted to formatted data such as JSON object 509. For example, the AI content may be unstructured GPT content, which may be transformed by the disclosed VIDS system 100 into a specific JSON object, the exact type of which may depend on the parameters included in the request.

The VIDS system 100 may further validate and convert the JSON object to a structured design layout in a type corresponding to the request. For example, the structured design layout may be an SVG, PNG, PDF, XLS, CSV, DOC, or another different type, as indicated by block 511 in FIG. 5. In some embodiments, the structured design layout may be delivered to the canvas or whiteboard for display.

In some embodiments, these structured layout files (or unstructured requests), when being rendered for display, may be further organized in different visual layout formats to be displayed on the whiteboard submitting the request. The layout can be in different formats according to the type of request, such as in text, template, diagram, wireframe, file, and so on, as indicated by block 513 in FIG. 5.

Here the following are some example visual layouts that can be generated by the VIDS system:

Unstructured text response as unformatted text layout on HTML5 canvas (e.g., whiteboard).

Unstructured text response as formatted text on canvas.

Structured data response to create a visual information representation of the content into different types of visual designs and layouts (template, diagram, wireframe, text, etc.)

Also, it can render formatted or unformatted responses into a specific graphic file like SVG, PNG, PDF, XLS, CSV, DOC, etc.

As can be seen above and as shown in FIG. 5, to allow the VIDS system 100 to properly display a desired visual layout, providing the correct request is very important, so that the disclosed VIDS system 100 can make sure such a request can be recognized. In the following, the processes for providing a request to the VIDS system 100 are further described with reference to some specific types of layout design.

According to one embodiment, a user may request a DDS-type request directly from a smart command such as "/ai" for the AI query or request. A "DetectInput" function may be included in the disclosed VIDS system 100, which can take in the user input string and determine the "type," "subject," and "content" included in the request. It should be noted that different types of "function" described throughout the specification may actually include a set of codes for achieving the functions indicated by the name of a function or the functions described for such "function."

Specifically, to determine the "type," the "DetectInput" function disclosed herein may look for any of the words "template," "wireframe," "diagram" or other predefined type-related words in the request input string. If any of these words are found, it may be set as the "type" for the object to be returned to the canvas. If none of these words is found, the "type" may then be set to "text" by default, which means that the text may be displayed in a general format in a format consistent with the smart commands as disclosed elsewhere herein.

To determine the "subject," the "DetectInput" function disclosed herein may look for the word(s) before the "type" word in the input string. If the "type" word is found, the word(s) before it may be set as the "subject" in the returned object. If the "type" word is not found, the "subject" may be left empty. In such a case, a returned object may be a visual layout in a desired format with no subject (or even content) entered in such layout.

To determine the "content," the "DetectInput" function disclosed herein may concatenate all the words in the input string that are not the "type" or "subject" words. The resulting string may be set as the "content" in the returned object. In some embodiments, the request string may further include certain smart commands configured for "content." In such cases, in determining the proper content for the returned object, beyond concatenating all the words in the input string that are not the "type" or "subject" words, the AI-generated content based on the smart content command as well as the concatenated words may be set as "content" in the returned object. For example, an input string may be: "Create a workflow diagram for Coffee shop app/ai." The outcome from the "DetectInput" function may be: {type: "diagram," subject: "workflow," content: "create a coffee shop app"}. Here, the content in the returned object may be AI-generated content related to "creating a coffee shop app," which may be presented in a diagram format in actual visual display.

In the next, the specific implementations of different types of visual layout representations are further described.

Dynamic Text Design System (DXDS)

According to one embodiment, the disclosed VIDS system 100 may dynamically generate text in a drawing or art project, and thus may be referred to as a dynamic text design system or DXDS. For example, when typing (e.g., through type-to-text input included in a canvas or online white-board), if a smart command "/ai" or "/universal" is typed after a few characters and then hit "Enter," the VIDS system 100 may be triggered to run an AI API application to collect the AI content related to the characters preceding the command. The collected AI content may be then rendered for display next to the characters.

In some embodiments, if the acquired AI content or AI response is a single line, the VIDS system 100 may render the response as a single text box. On the other hand, if the AI content or AI response includes multiple lines, then the VIDS system 100 may render the response in a single text object with structured, formatted text.

Figure 6:
FIG. 6 illustrates an example user input and an example visual display of AI response generated by a dynamic text design system, according to some embodiments.

FIG. 6 illustrates an example user input and an example visual display of the AI content generated by the DXDS system. As illustrated, when a user input includes an instruction to "generate 2 benefits of patent," the obtained AI content includes two exemplary benefits of patent, which are rendered for display in a structured, formatted text as a text object due to the multiple lines included in the obtained AI content.

In another example included in FIG. 6, when a user input includes an instruction to "generate 2 tweets on US patent system," the DXDS system automatically generates two tweets on the US patent system, which are rendered for display also in a structured, formatted text as a text object, due to the multiple lines included in the obtained AI content.

In some embodiments, when the command "/stickynote" is used, the AI response may be returned as sticky notes on the canvas. In some embodiments, when the command "/dp" is used, the AI response may be returned as multiple textbox objects. If the AI response includes a single line, the AI response may be rendered as a sticky note or textbox. If the AI response includes multiple lines, separated by a newline character ("/n"), the AI response may be rendered as multiple sticky notes on the canvas.

Figure 7:
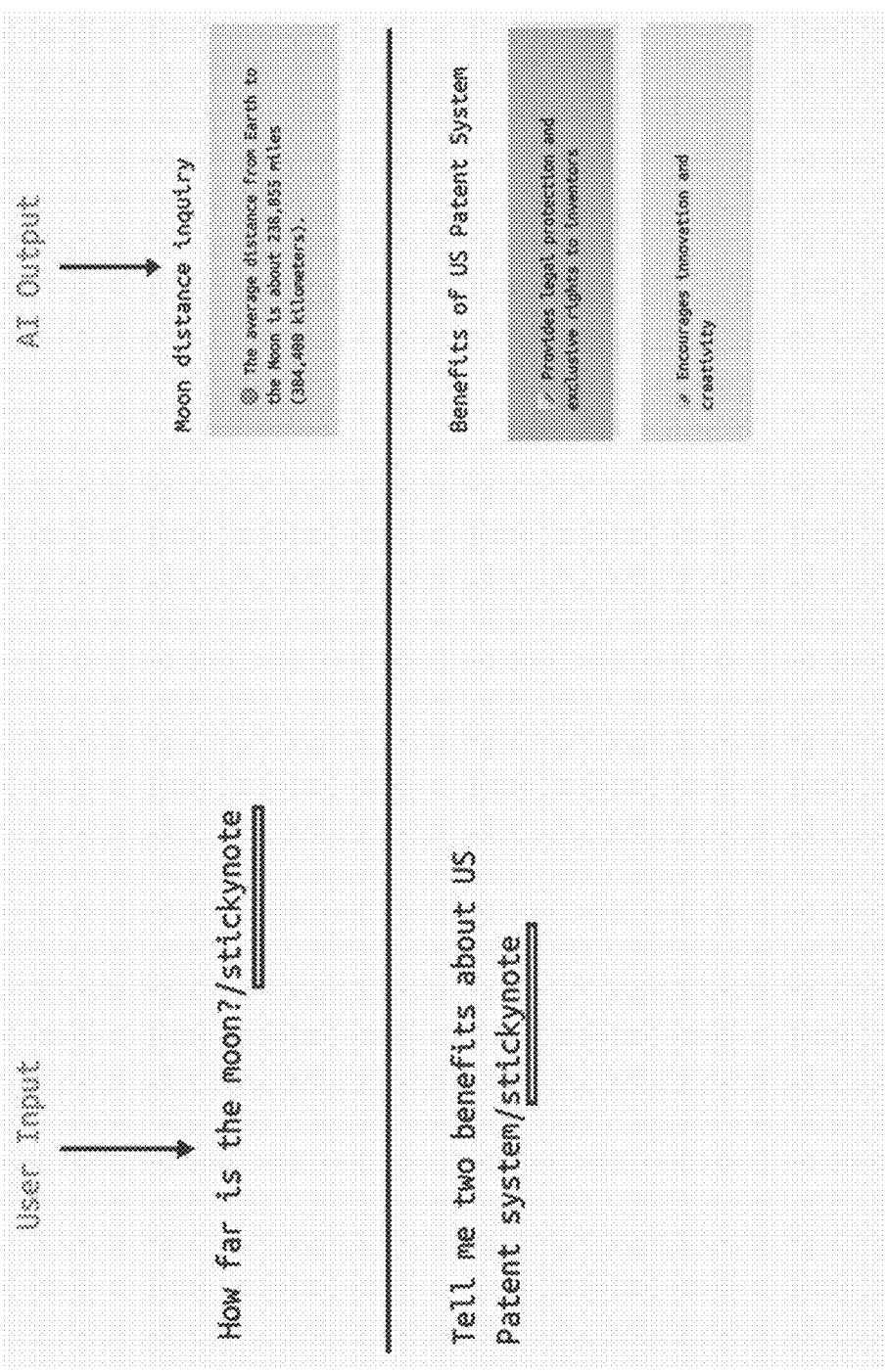
FIG. 7 illustrates example sticky notes generated by a dynamic text design system, according to some embodiments.

FIG. 7 illustrates example sticky notes generated by the DXDS system. As a first example, for user input "How far is the moon?/stickynote," the generated AI response is displayed as a single sticky note. As a second example, for user input "Tell me two benefits about US Patent system/stickynote," the AI response is displayed as two sticky notes on the canvas.

In some embodiments, the AI response may be further stylized based on the content included therein. In one example, when a user requests a text response that matches some conditions like hashtags, bullet points, or numbering, a function such as aiTextReplayStyling( ) may stylize the AI response. The aiTextReplayStyling( ) function may take a single argument, textbox, and may be responsible for styling the text in the textBox object in a specific way.

In some embodiments, the aiTextReplayStyling( ) function may begin by using the match( ) method to find any sequences of numbers followed by a period, and any sequences of numbers followed by a period and a space, followed by some text and a colon, in the text property of the textBox object. In some embodiments, the aiTextReplayStyling( ) function may also use the matchAll( ) method to find all occurrences of hashtags (such as words beginning with a '/' symbol) in the text property of the textBox object. In some embodiments, the aiTextReplayStyling( ) function may further check if either of the aforementioned two regular expression matches return a non-null value (i.e., if there are any matches). If there are, the aiTextReplayStyling( ) function may iterate through the matches and use the setSelectionStyles( ) method for the textBox object to update the font weight and color of the matching characters. If there is no match, the aiTextReplayStyling( ) function may set the font weight of the entire text property of the textBox object to 'bold'. In some embodiments, the aiTextReplayStyling( ) function may further count the occurrences of each hashtag and store the start and end indices of each occurrence. The aiTextReplayStyling( ) function may then iterate through the hashtag counts and use the setSelectionStyles( ) method to update the font weight and color of each hashtag in the text property of the textBox object. Through these different processes, the AI response can be further stylized when rendered for display on canvas.

Dynamic Template Design System (DTDS)

According to another embodiment, the disclosed VIDS system 100 may also generate dynamic templates and thus may be referred to as a dynamic template design system (DTDS). For example, the disclosed VIDS system 100 may allow users to input specific parameters that may be passed as commands or instructions to an AI engine (e.g., GPT) in order to generate specific templates for a 2d HTML5 canvas (e.g., an online whiteboard). These parameters may include the subject or topic (e.g., strengths, weaknesses, opportunities, and threats (SWOT)) of the template the user wants to generate and additional information and context about the use case (e.g. for a coffee shop). If the use case is a template analysis, then the DTDS system may require a user to input sample data used in the analysis. Here the following are some example user inputs that trigger the generation of dynamic templates.

User Input "{{Subject}}": Subject or topic of the template the users want to generate (e.g., SWOT).

User Input "{{Content}}": More information and content of the use case (e.g., for a coffee chop).

User Input "{{Context}}": More information and context of the use case (e.g., custom columns/sections or description about the template. Default value may be set to "generic").

User Input "{{Data}}": Applicable when a user chooses to generate a template with data analysis.

In some embodiments, users may input the user inputs from a user interface that includes certain predefined "AI recipes" or text commands, such as "SWOT Template for Coffee shop/ai."

FIG. 8 illustrates example user interfaces for inputting user inputs for dynamic template design. In some embodiments, the AI recipes in the user interfaces include the categories and their recipes (i.e., subcategories) may work from a single JSON instruction and construction. Here the following is an example AI recipe in JSON schema:

```
{
    "name" : " { {Recipe Name} }",
    "icon" : "{ {Recipe Icon Image} }",
    "about" : "{ {About this Recipe}",
    "label" : "{ {Label of the Recipe} }",
    "inputs" : [
        {
            "id" : "{ {Key id} }",
            "paramType" : "{ {AI prompt name} }",
            "inputType" : "{ {Html Input Type} }",
            "label" : "{ {Label of the AI Prompt} }",
            "options" : [
                {
                    "{ {Prompt Id} }" : "{ {User Display Value 1} }"
                },
                {
                    "{ {Prompt Id} }": "{ {User Display Value 2} }"
                }
            ]
        },
        {
            "id" : " { {Key id} }",
            "dependencyType" : "Prompt id dependency",
            "paramType" : "{ {Prompt parameter name} }",
            "inputType" : "{ {Html Input Type} }",
            "label" : "{ {Label to Input} }",
            "prefixValue" : "{ {Prefix value before user input} }",
            "placeholder" : "{ {Placeholder value} } ",
            "suffixValue" : "{ {Suffix value before user input} }",
            "required" : { {true or false} }
        }
        . . .
    }
```

The above JSON construct represents an example AI recipe, which may be a form for user inputs, which includes various fields for users to fill out. Each field (or "input") is defined by an object within the "inputs" array. Each input object may include several properties, such as "id," "paramType," "inputType," "label," "options," etc.

The "id" property is a unique identifier for the input field. The "paramType" property is the name of the AI prompt that the input field corresponds to. The "inputType" property specifies the type of HTML input element that should be used to render the field, such as a text field or drop-down menu. The "label" property is the text that should be displayed as the label for the input field. The "options" property is an array of objects that define the options that should be displayed for a drop-down menu, a check box, a radio button input, and the like.

The "dependencyType" property is the prompt id dependency, which is used to determine which prompt id to choose and pass parameters to return JSON data. The "prefix Value" property is the value that should be stored before the user's input value, the "placeholder" property is the placeholder value of the input, and "suffix Value" property is the value that should be stored after the user's input. The perfix Value, input Value, and suffix Value will construct a parameter for the prompt. The "required" property is a boolean value that indicates whether the input field is required or not.

Once a user fills out the form and submits it, the values entered may be sent to the backend (e.g., the visual information design server 101 shown in FIG. 1). The backend may then choose which prompt id to use based on the "dependencyType" property, and the backend may pass the appropriate parameters to return a JSON data, which may be used to render a visual content template.

For example, a prompt id of "prompt-1" is shown below, which comes from the user choice that has been given in the recipe's first key:

"Give a comprehensive analysis on <usersPrompt> {{subject}} {{content}}</usersPrompt> in a valid JSON-only format of: {\"t\": \"Title\", \"c\": \"About\", \"m\": [{\"n\": \"Section Label\", \"e\": \"Emoji\", \"s\": \"Section Note\", \"x\": [\"Examples as String Array\"], \"co\": [\"sticky-notes background colors in hexadecimal code for each Example as string Array (Choose unique subtle color and shades for each Template Section)\"], \"fc\": [\"sticky-notes font color in hexadecimal code for each Example as Array (black or white for readability)\"]}]}. Don't create notes or your comments outside of JSON. If the usersPrompt lacks specifics, is outside of context or if you encounter an exception, respond with this JSON format: {\"e\": \"your (meaningful) message to the user on the UI\"}. Don't response or make comments outside of the given instructions."

This prompt has 3 parameters, paramTypes: <usersPrompt> . . . </usersPrompt> where user entered value will be passed as {{subject}} {{content}} and additional optional instructions will by passed through {{context}}. If the "subject" parameter includes a prefix Value of "SWOT Analysis" and a suffix Value of "for AI Powered CRM Platform" and if the user enters the value "for AI Powered CRM Platform" for the "content" parameter, the entire parameter will be "SWOT Analysis for AI Powered CRM Platform."

Here the following are some example Prompt sample JSON responses.

"Templates" Prompt sample JSON response:

"Give a comprehensive analysis on <usersPrompt> {{subject}}{{content}}</usersPrompt> in a valid JSON-only format of: {\"t\": \"Title\", \"c\": \"About\", \"m\": [{\"n\": \"Section Label\", \"e\": \"Emoji\", \"s\": \"Section Note\", \"x\": [\"Examples as String Array\"], \"co\": [\"sticky-notes background colors in hexadecimal code for each Example as string Array (Choose unique subtle color and shades for each Template Section)\"], \"fc\": [\"sticky-notes font color in hexadecimal code for each Example as Array (black or white for readability)\"]}]}. Don't create notes or your comments outside of JSON. If the usersPrompt lacks specifics, is outside of context or if you encounter an exception, respond with this JSON format: {\"e\": \"your (meaningful) message to the user on the UI\"}. Don't response or make comments outside of the given instructions."

"Template with Contextual data" Prompt sample JSON response:
<contextData>
{{context}}
</contextData>;
"Give a comprehensive analysis on <usersPrompt>{{subject}}{{content}}</usersPrompt> in a valid JSON-only format of: {\"t\": \"Title\", \"c\": \"About\", \"m\": [{\"n\": \"Section Label\", \"e\": \"Emoji\", \"s\": \"Section Note\", \"x\": [\"Examples as String Array\"], \"co\": [\"sticky-notes background colors in hexadecimal code for each Example as string Array (Choose unique subtle color and shades for each Template Section)\"], \"fc\": [\"sticky-notes font color in hexadecimal code for each Example as Array (black or white for readability)\"]}]}. Don't create notes or your comments outside of JSON. If the usersPrompt lacks specifics, is outside of context or if you encounter an exception, respond with this JSON format: {\"e\": \"your (meaningful) message to the user on the UI\"}. Don't response or make comments outside of the given instructions."

Here the following are some example commands for sample JSON responses.

Example command for sample JSON response:
"Give a comprehensive analysis on <usersPrompt>Mad, Sad, Glad for: Coffee Shop</usersPrompt> in a valid JSON-only format of: {\"t\": \"Title\", \"c\": \"About\", \"m\": [{\"n\": \"Section Label\", \"e\": \"Emoji\", \"s\": \"Section Note\", \"x\": [\"Examples as String Array\"], \"co\": [\"sticky-notes background colors in hexadecimal code for each Example as string Array (Choose unique subtle color and shades for each Template Section)\"], \"fc\": [\"sticky-notes font color in hexadecimal code for each Example as Array (black or white for readability)\"]}]}. Don't create notes or your comments outside of JSON. If the usersPrompt lacks specifics, is outside of context or if you encounter an exception, respond with this JSON format: {\"e\": \"your (meaningful) message to the user on the UI\"}. Don't response or make comments outside of the given instructions."

Example command with additional context as {{context}} that can go with either of the parameter for {{subject}} or {{content}} for sample JSON response:
<contextData>
Fast Ninja, Dancing Ninja, Slow Ninjas are slow moving long term goals.
</contextData>;
"Give a comprehensive analysis on <usersPrompt>3 Ninjas Analysis for: Coffee Shop, context: contextData</usersPrompt> in a valid JSON-only format of: {\"t\": \"Title\", \"c\": \"About\", \"m\": [{\"n\": \"Section Label\", \"\": \"Emoji\", \"s\": \"Section Note\", \"x\": [\"Examples as String Array\"], \"co\": [\"sticky-notes background colors in hexadecimal code for each Example as string Array (Choose unique subtle color and shades for each Template Section)\"], \"fc\": [\"sticky-notes font color in hexadecimal code for each Example as Array (black or white for readability)\"]}]}. Don't create notes or your comments outside of JSON. If the usersPrompt lacks specifics, is outside of context or if you encounter an exception, respond with this JSON format: {\"e\": \"your (meaningful) message to the user on the UI\"}. Don't response or make comments outside of the given instructions."

For Minified JSON return which would reduce the token/response size:
"Give a comprehensive analysis on <usersPrompt>Mad, Sad, Glad for: Coffee Shop</usersPrompt> in a valid minify-JSON-only format of: {\"t\": \"Title\", \"c\": \"About\", \"m\": [{\"n\": \"Section Label\", \"e\": \"Emoji\", \"s\": \"Section Note\", \"x\": [\"Examples as String Array\"], \"co\": [\"sticky-notes background colors in hexadecimal code for each Example as string Array (Choose unique subtle color and shades for each Template Section)\"], \"fc\": [\"sticky-notes font color in hexadecimal code for each Example as Array (black or white for readability)\"]}]}. Don't create notes or your comments outside of JSON. If the usersPrompt lacks specifics, is outside of context or if you encounter an exception, respond with this JSON format: {\"e\": \"your (meaningful) message to the user on the UI\"}. Don't response or make comments outside of the given instructions."

In some embodiments, a strict schema may be created that may be used for all over the disclosed system to render templates with content.

Figure 9:
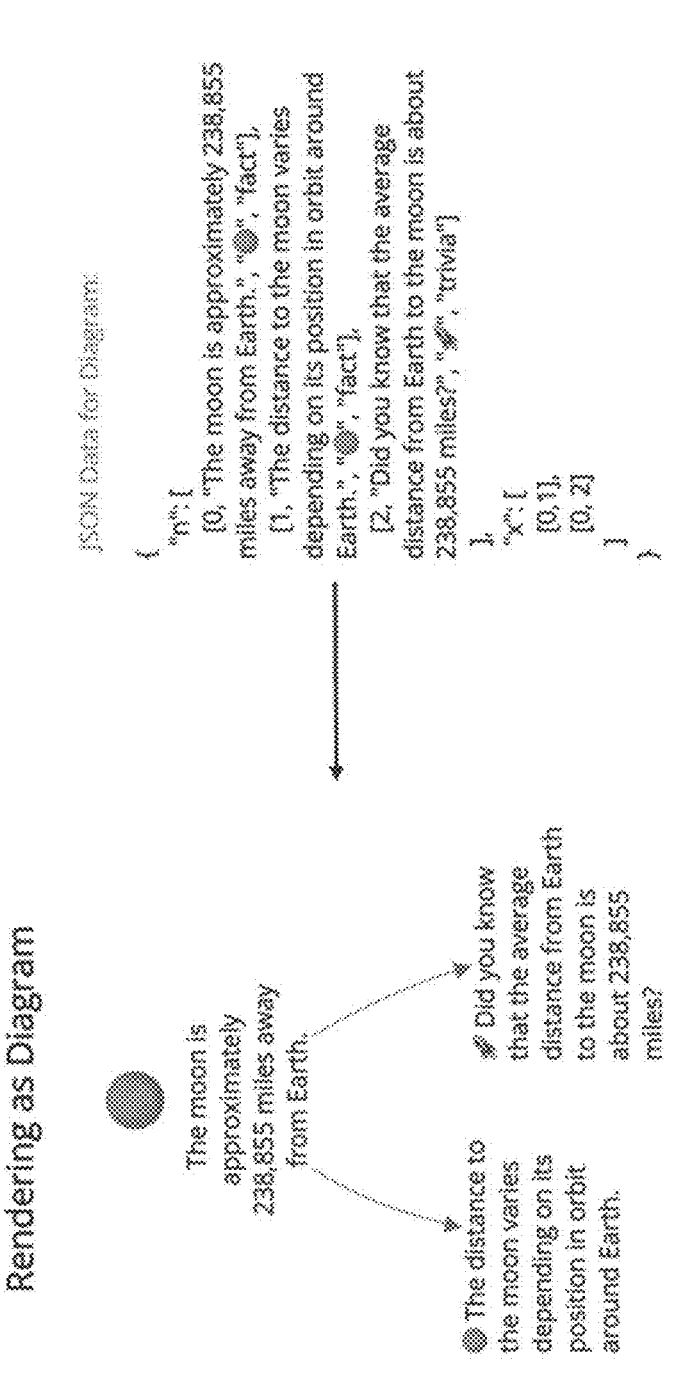
FIG. 9 illustrates an example output JSON response for a foundation prompt and associated JSON schema, according to some embodiments.

FIG. 9 illustrates an example output JSON response for a foundation prompt (e.g., a diagram) and the associated JSON schema, according to some embodiments. Compared to the example output shown in FIG. 7, in the illustrated example FIG. 9, the actual output are connected and relational between different nodes to display an actual relational diagram.

In some embodiments, depending on the number of "m": {Template Section} along with the template name/type match, the DTDS system disclosed herein may determine the possible layout of the template. For example, for the "Odd" number of "m": {Template Section}, the DTDS system may pick "Single-row layout," and for the "Even" number of "m": {Template Section}, the DTDS system may pick "Multi-Row Layout" (e.g. SWOT (4×4) template). In the case that "m": {Template Section}" returns 5, the DTDS system may render it as a "Star" layout. In the case that "m": {Template Section}" returns 9, the DTDS system may then return "nine-grid layout."

The above-described schema may be also responsible for rendering a layout for some data contained in a JSON data structure that is requested. The schema may retrieve the data for the template from the JSON data using the Data( ) function. The function may then check the number of sections in the template data and choose a layout to render based on the number of sections. If the template data has 5 sections, the function may call a renderStarTemplate( ) function to render the layout. If the template data has 9 sections, the function may then call a renderNineGridTemplate( ) function to render the layout. If the template data has an odd number of sections, the function may call a renderSingleRowTemplate( ) function to render the layout. Otherwise, the function may call a renderMultiRowTemplate( ) function to render the layout. In the following, single-row layouts and multi-row layouts are further illustrated.

According to one embodiment, for the renderSingleRowTemplate( ) function, the layout may display the template sections in a horizontal list, with each section taking up the entire container height. In addition, the "sections" may be displayed in the order defined in the template unless a custom order is specified. Further, each section may have a title and a description and may include additional elements such as images or data visualization tools.

Figure 10A:
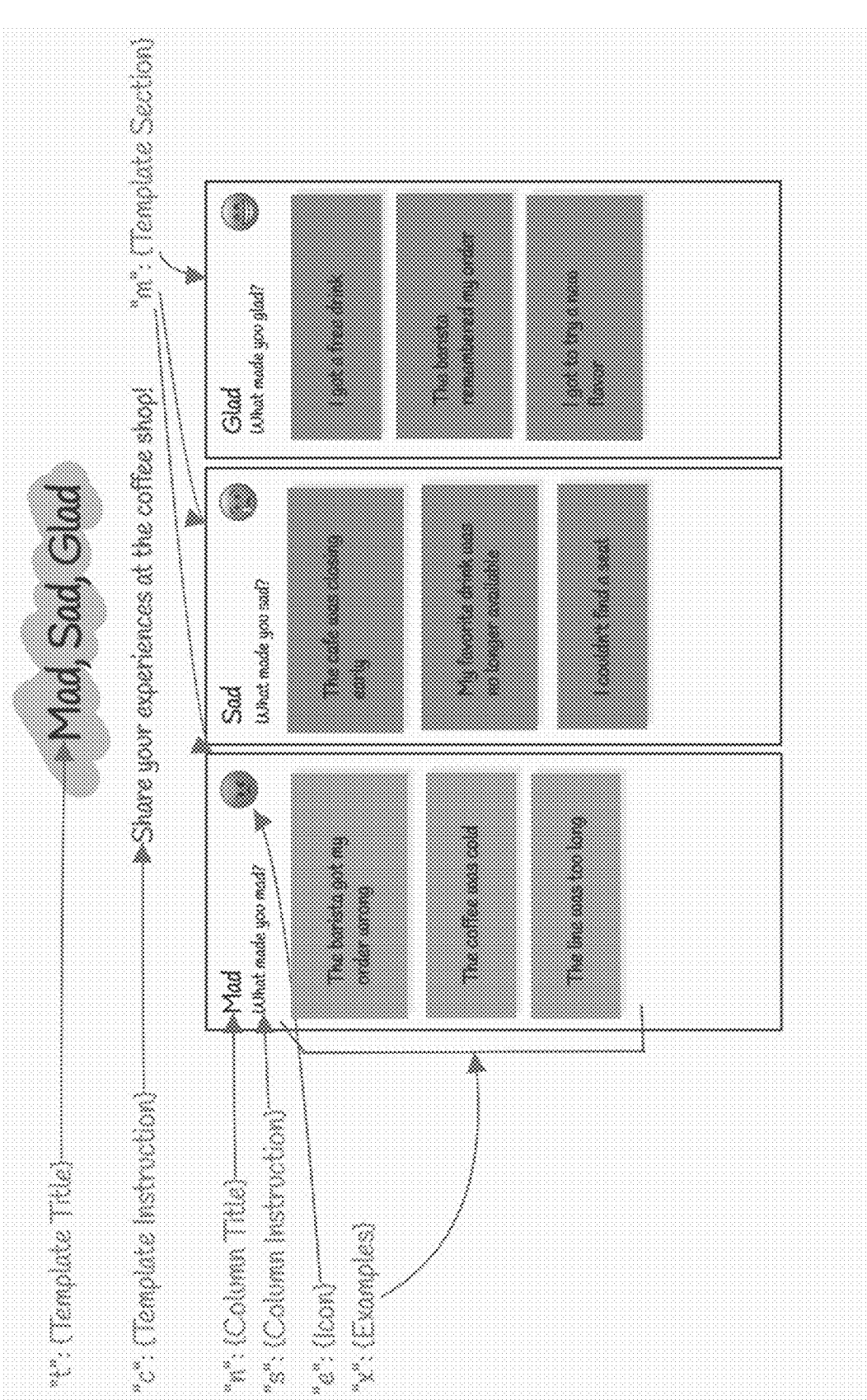
FIG. 10A illustrates an example single-row layout template rendering on a canvas, according to some embodiments.

FIG. 10A illustrates an example single-row layout template rendering on a canvas. As can be seen in the figure, there are three sections (i.e., Mad, Sad, and Glad sections)

that are displayed in a horizontal list, with each section taking up the entire container height. The three sections are displayed in the order defined in the template (not shown). In addition, each of the three sections has a title (such as Mad, Sad, or Glad), and a description (such as "What makes you mad/sad/glad?"). In addition, each section also has an icon, and the "examples" as illustrated in FIG. 10A.

In some embodiments, the code for such layout assumes that one already has a function Data( ) that retrieves the data for the template "table" layout from JSON response, which may be the AI engine-generated data for templates. In addition, the code for such a single-row layout also assumes that one also has a custom FabricJS object (such as a DojoitStickyNote) that represents a sticky note. To create the table, the total width of the table is first calculated based on the number of columns and the column width/separation values. Then loop through the template sections to get the single-row layout.

In the next, the muti-row layout is further described.

According to one embodiment, for the renderMultiRow-Template ( ) function, the layout may display the template sections in a multi-row grid, each section taking up a certain number of columns and rows. In addition, the grid layout may be customized to fit the specific needs of the template, such as by adjusting the number of columns and rows or by setting a fixed width for each section.

Here the following is an example prompt for a sample JSON request:

"Give a comprehensive analysis on <usersPrompt>SWOT Analysis for Coffee Shop</usersPrompt> in a valid JSON-only format of: {\"t\": \"Title\", \"c\": \"About\", \"m\": [{\"n\": \"Section Label\", \"e\": \"Emoji\", \"s\": \"Section Note\", \"x\": [\"Examples as String Array\"], \"co\": [{\"sticky-notes background colors in hexadecimal code for each Example as string Array (Choose unique subtle color and shades for each Template Section)\"], \"fc\": [{\"sticky-notes font color in hexadecimal code for each Example as Array (black or white for readability)\"]}]}. Don't create notes or your comments outside of JSON. If the usersPrompt lacks specifics, is outside of context or if you encounter an exception, respond with this JSON format: {\"e\": \"your (meaningful) message to the user on the UI\"}. Don't response or make comments outside of the given instructions."

Here the following is an example JSON file for the multi-row layout from JSON response (e.g., SWOT Analysis):

```
{
  "t" : "SWOT Analysis for Coffee shop",
  "c": "A SWOT analysis is a strategic planning tool used to evaluate
the strengths, weaknesses, opportunities, and threats of a business.
Here is a comprehensive analysis of a coffee shop using the SWOT
framework.",
  "m": [
    {
      "n": "Strengths",
      "e": "🔑 ",
      "s": "Internal factors that give the coffee shop an advantage",
      "x": [
        "Prime location in a high foot traffic area",
        "Wide variety of specialty coffee options",
        "Well-trained and friendly staff"
      ],
      "co": [
        "#FFD700",
        "#FFAD00",
        "#FFC700"
      ],
```

```
      "fc": [
        "#000000",
        "#000000",
        "#000000"
      ]
    },
    {
      "n": "Weaknesses",
      "e": "🔻 ",
      "s": "Internal factors that may hinder the coffee shop's success",
      "x": [
        "Limited parking space",
        "High competition from nearby cafes",
        "Reliance on seasonal customer influx"
      ],
      "co": [
        "#FF6961",
        "#FF8C78",
        "#FF7F50"
      ],
      "fc": [
        "#FFFFFF",
        "#000000",
        "#000000"
      ]
    },
    {
      "n" : "Opportunities",
      "e" : "✴ ",
      "s": "External factors that the coffee shop could exploit",
      "x": [
        "Growing demand for specialty coffee",
        "Expansion into online delivery services",
        "Collaboration with local businesses for cross-promotion"
      ],
      "co": [
        "# 77DD77" ,
        "#50C878",
        "#3CB371"
      ],
      "fc": [
        "#000000",
        "#000000",
        "#000000"
      ]
    },
    {
      "n": "Threats",
      "e": "⚠ ",
      "s": "External factors that could potentially harm the coffee
shop",
      "x" : [
        "Economic downturn affecting customer spending",
        "Changing consumer preferences towards healthier alternatives",
        "Rising costs of coffee beans"
      ],
      "co": [
        "#FFA07A",
        "#FF7F50",
        "#FF6347"
      ],
      "fc": [
        "#000000",
        "#000000",
        "#000000"
      ]
    }
  ]
}
```

As can be seen, the JSON file includes a top-level "t" key, which specifies the title of the template, and a "c" key, which provides a description of the template. It also includes an "m" key, which specifies a list of objects representing the section of the template.

Each section of the templates is represented as an object with four primary keys: "n," which specifies the name of the element; "e," which specifies an icon (emoji symbol in this case) representing the element; "s," which provides a prompt or question related to the element; and "x," which specifies a list of examples or ideas related to the section. Also optional keys: "co," for background sticky-notes hexadecimal color code, and "fc," for font for sticky-notes hexadecimal color code, which can be used to set colors for visual rendering of those examples from "x,".

To use the above JSON file as a template for conducting a SWOT analysis from this sample JSON data above, one may iterate through the list of elements and use the prompts and examples provided to guide the analysis process. For example, one could use the prompt "What are the strengths of your coffee shop?" and the list of examples provided under the "Strengths" element to generate a list of the strengths of the coffee shop being analyzed.

Figure 10B:
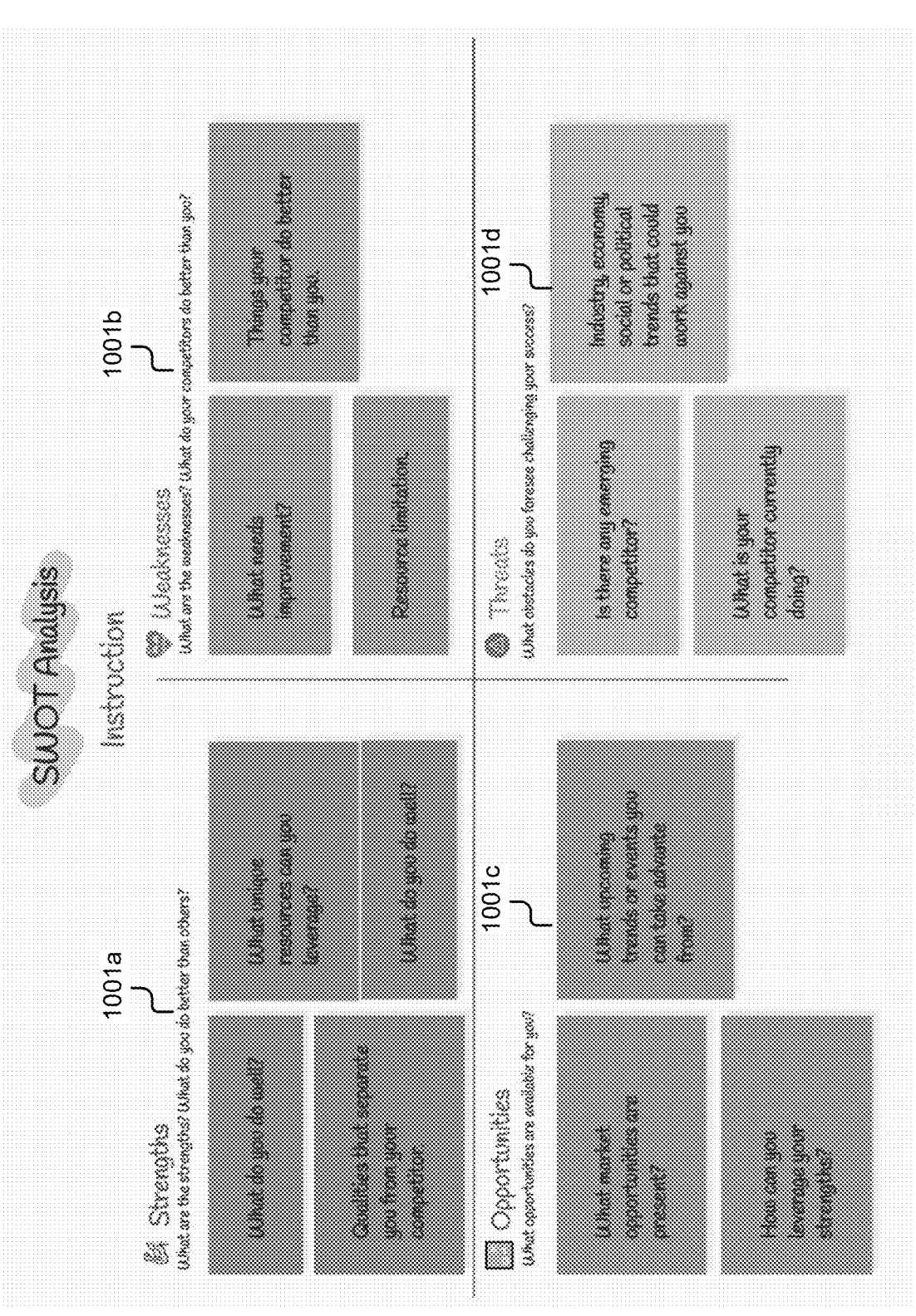
FIG. 10B illustrates an example multi-row layout from a JSON response, according to some embodiments.

FIG. 10B illustrates an example multi-row layout from a JSON response (e.g., SWOT Analysis). As can be seen, the multi-row layout for the SWOT analysis includes two rows and two columns that together have four sections 1001*a*-1001*d*. Each section represents an object with four keys, such as the name of the element, an icon presenting the element, a prompt or question related to the element, and a list of examples or ideas related to the section.

According to some embodiments, the renderMultiRow-Template( ) function may use the data object to create various fabric.js objects with the construct created by the disclosed system, such as text boxes and sticky notes, and positions them according to the data and the calculated layout. The renderMultiRowTemplate( ) function may also create lines between sections, add all the objects to the canvas, and finally render the canvas for visual representation.

In the next, the star layout is further described.

According to some embodiments, for a star layout, the layout may display the template sections in a radial pattern, with one section at the center and the others arranged around it in a star shape. The center section may be emphasized by giving it a larger size or a different color than the other sections. In addition, the sections may be linked to one another with lines or arrows, to show the relationships between the linked sections.

Figure 11:
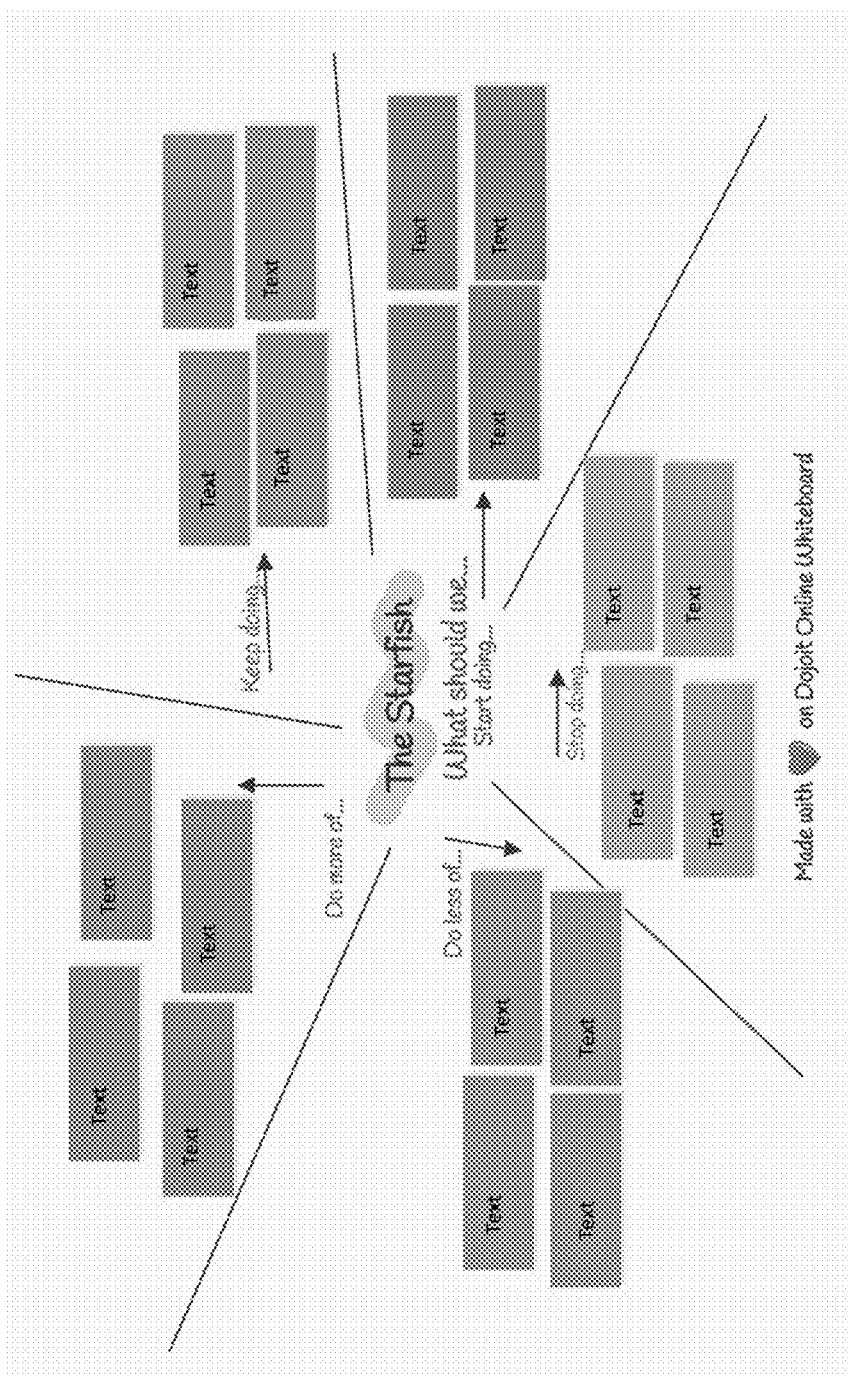
FIG. 11 illustrates an example star layout, according to some embodiments.

FIG. 11 illustrates an example star layout. As can be seen in the figure, in the star layout, the template title and instructions are in the center of the canvas (which may be referred to as the center section described above). Each remaining section is in a radial pattern with a line separator at a 360-degree angle. Each section may cover the same volume of space among these remaining sections, or the space volume for each section may be adjusted based on the content included in each section. The titles and instructions for each section may be placed on the edge of each section radially. The lines may not overlap the text contents in the center section, as can be seen in the figure. In some embodiments, the aforementioned renderStarTemplate( ) function is used to generate the star layout shown in FIG. 11.

It should be noted that, for a star layout, the present disclosure is not limited to the number of sections shown in FIG. 11 or described earlier. Instead, the star layout may have any number of sections, such as 3, 4, 5, 6, 7, 8, 9, 10, 11, 12, 13, 14, 15, 16, etc. The exact number of sections for an actual star layout may be defined through the renderStar-Template( ) function.

In the next, the nine-grid layout is further described.

According to some embodiments, a nine-grid layout may be designed to fit the specific needs of a template. In some embodiments, the nine-grid disclosed herein may not follow the standard grid or list patterns.

Figure 12:
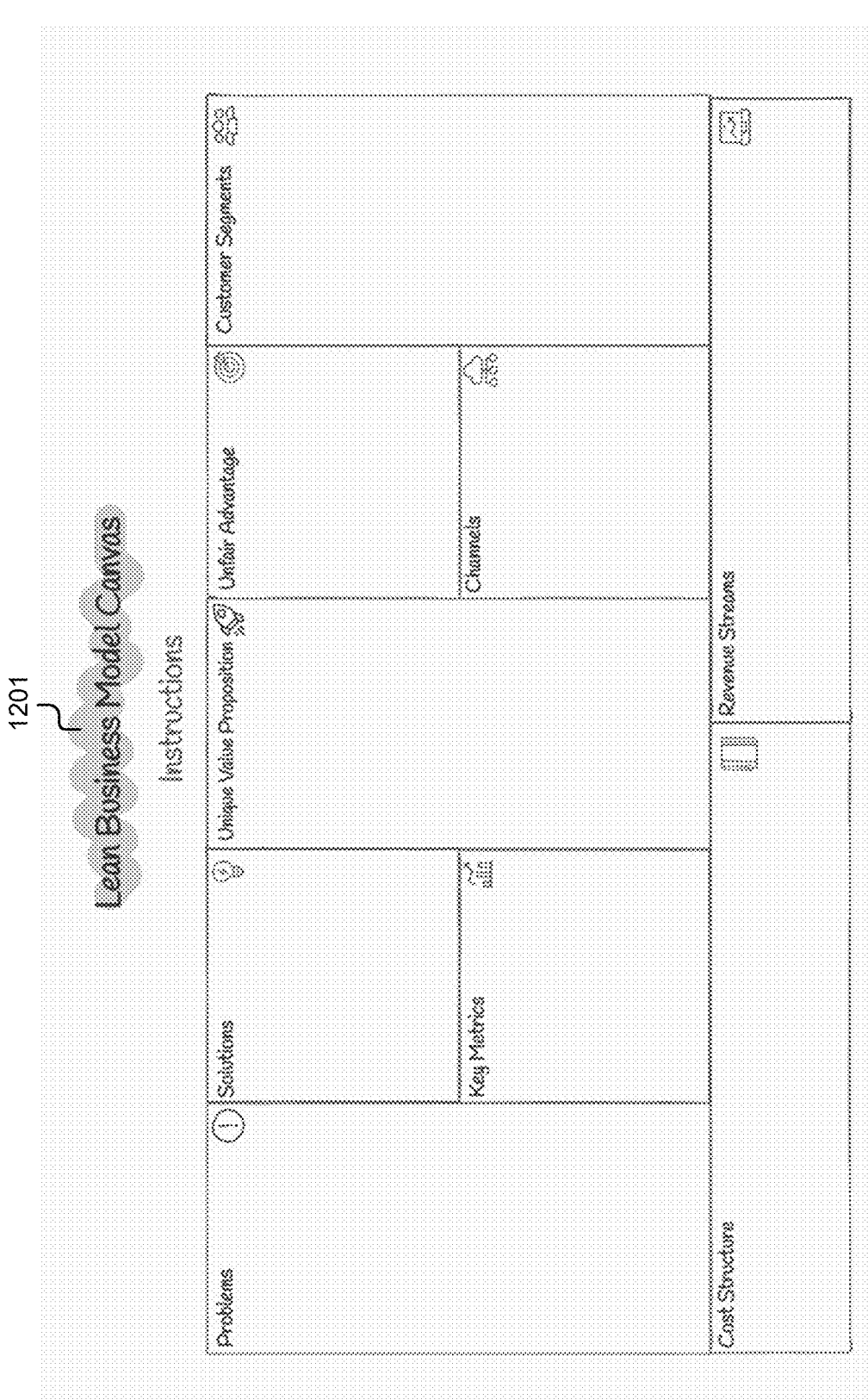
FIG. 12 illustrates an example nine-grid layout, according to some embodiments.

FIG. 12 illustrates an example nine-grid layout. The example layout is generated for a "lean business model canvas." As can be seen in FIG. 12, the grids in the layout do not follow the standard grid or list patterns, but rather a specialized layout that includes five columns in the upper row and two columns in the lower row. In the five columns in the upper row, the second and fourth columns are further divided into two rows. As can be also seen in FIG. 12, each section may further include a title to specify the element in the section. In some embodiments, the aforementioned renderNineGridTemplate( ) function is used to generate the star layout shown in FIG. 12.

It should be noted that, for a nine-grid layout, the present disclosure is not limited to the number of grids shown in FIG. 12 or described earlier. Instead, the nine-grid layout may have any number of grids, such as 3, 4, 5, 6, 7, 8, 9, 10, 11, 12, 13, 14, 15, 16, etc., according to some embodiments. These layouts may be thus referred to as three-grid layout, four-grid layout, five-grid layout, six-grid layout, etc. In some embodiments, the exact number of grids for an actual grid layout may be defined through the renderNineGridTemplate( ) function. In addition, the specific layout of these grids is not limited to the size and shape of each section shown in FIG. 12. Instead, the shape, size, and organization of these grids may be adjusted in advance according to the parameters set in the renderNineGridTemplate( ) function, and/or may be dynamically adjusted based on the content (or data) for each section when displaying the layout.

In some embodiments, besides the layout of the AI response in a specific manner such as a single-row, multi-row, star layout, or nine-grid layout, additional elements may be further added to the layout to manipulate the visual effect of the displayed content. For example, as shown in FIG. 12, a zigzag line stroke layer 1201 may be added below a title, to emphasize the title or make it more obvious. A similar zigzag line stroke layer may also be found in layouts shown in FIGS. 9-12.

In some embodiments, there are many other types of styles for rendering a visual layout. It is to be noted that the above described layouts are merely for exemplary purposes, and not for limitations. The present disclosure may include many other layout styles not described above.

Dynamic Diagram Design System (DDDS)

According to one embodiment, the disclosed VIDS system 100 may be further configured to generate dynamic diagrams and thus may be referred to as a dynamic diagram design system (DDDS). For example, the disclosed VIDS system 100 may allow users to input specific parameters that are passed as commands or instructions to an AI model (e.g., GPT) in order to generate a specific type of diagram for the 2d HTML5 canvas (e.g., an online whiteboard). These parameters may include the subject or topic of the diagram the user wants to generate (e.g. Flowchart, Tree, Mindmap, etc.) and additional information and content about the use case (e.g. Online Shopping Portal). Here the following are two example user requests:

User Input "{{Subject}}": Type or topic of the diagram a user wants to generate (e.g. flowchart)·

User Input "{{Content}}": More information and content of the use case (e.g. online shopping portal)

According to some embodiments, users may request such requests from a user interface including an AI dropdown menu, or by using a text command "Create a Flowchart Diagram Travel App/ai."

Figure 13:
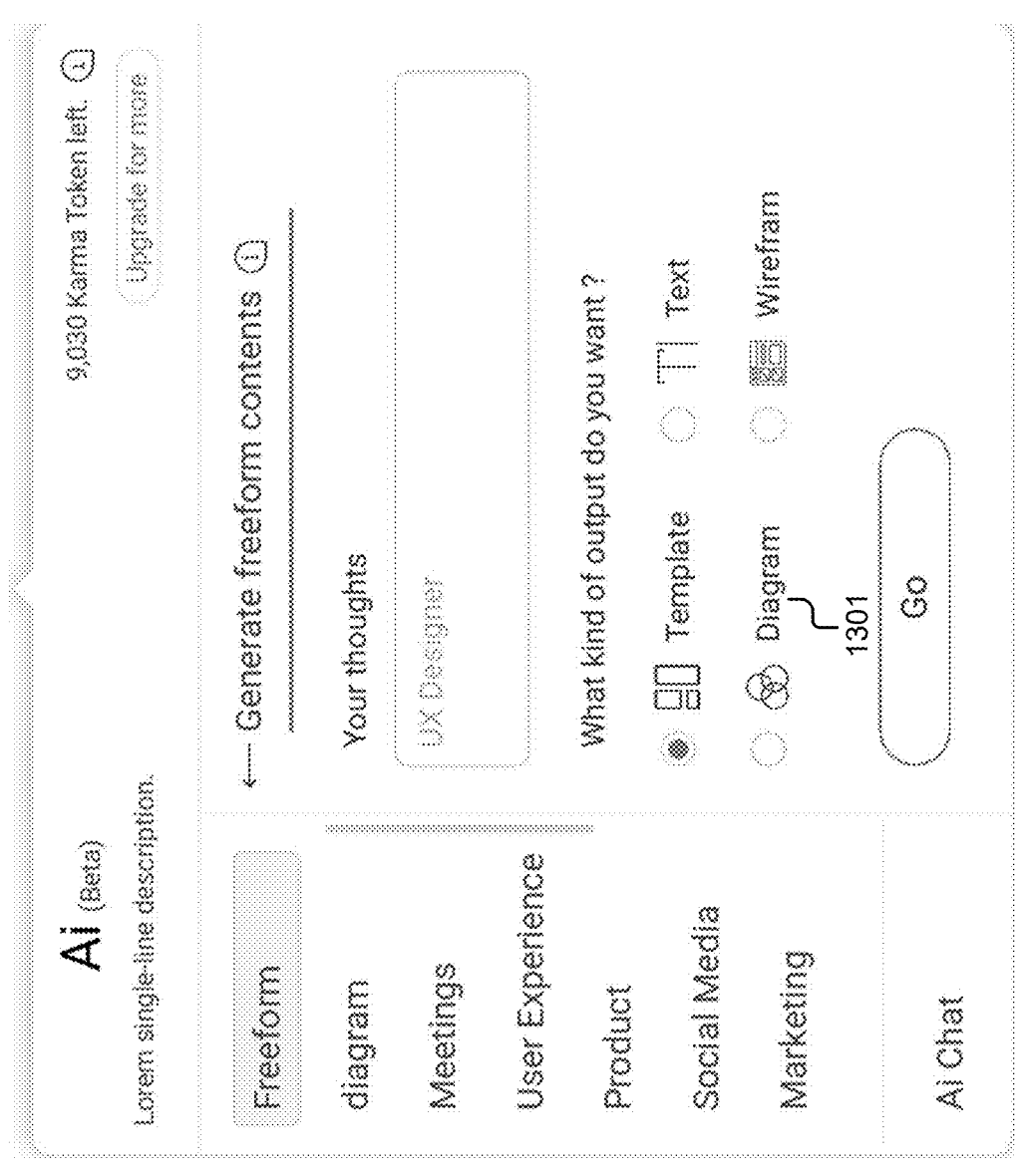
FIG. 13 illustrates an example user interface for inputting user requests for dynamic diagram design, according to some embodiments.

FIG. 13 illustrates an example user interface for inputting user requests for dynamic diagram design. As can be seen, the diagram category may work from a single JSON instruction and construction. As can be also seen in FIG. 13, a user may choose diagram 1301 as an output that the user hopes to.

Here the following is an example prompt for a diagram, which may be set as the foundation for other diagrams including flowcharts among others:
"Understand <usersPrompt Explain how our solar system works</usersPrompt> and create a connected answer in valid JSON format: {\"n\"Node array [numeric id, \"your answer\", \"Emoji\", \"Type \"], \"x\"Connection array [Source Node id, Target Node id]}. Make sure the connection is meaningful and not repetitive. If the usersPrompt lacks specifics, is outside of context or if you encounter an exception, respond with this JSON format: {\"e\": \"your (meaningful) message to the user on the UI\"}. Don't response or make comments outside of the given instructions."

Here the following is an example GPT prompt for DDDS: Understand <usersPrompt>{{subject}}{{content}}</usersPrompt> and create a connected answer in valid JSON format: {\"n\" Node array [numeric id, \"your answer\", \"Emoji\", \"Type\"], \"x\" Connection array [Source Node id, Target Node id]}. Make sure the connection is meaningful and not repetitive. If the usersPrompt lacks specifics, is outside of context or if you encounter an exception, respond with this JSON format: {\"e\": \"your (meaningful) message to the user on the UI\"}. Don't response or make comments outside of the given instructions."

In some embodiments, for flowcharts or other diagrams like unified modeling language (UML) that require bringing the types of shapes, the prompts may be a little different although the foundation may be similar to the above prompt. Here the flowing is an example prompt that defines a list of shapes for AI to choose from to get an actual response with shapes for those other type of diagrams:
"$shapeType=choose from this list [\"start\", \"process\", \"decision \", \"input-output\", \"pre-defined-process\", \"terminator\", \"on-page-connection\", \"off-page-connection\", \"delay\", \"alternate-process \", \"document\", \"preparation\", \"merge \", \"manual-input\", \"manual-operation\", \"database\", \"end\"]; Understand <usersPrompt>{{subject}}{{content}}</usersPrompt> and create a connected answer for a flowchart in valid JSON format: {\"n\" Node array [numeric id, \"your answer\", \"Emoji\", choose a \"$shapeType\" for the answer], \"x\" Connection array [Source Node id, Target Node id]}. Make sure the connection is meaningful and not repetitive. If the usersPrompt lacks specifics, is outside of context or if you encounter an exception, respond with this JSON format: {\"e\": \"your (meaningful) message to the user on the UI\"}. Don't response or make comments outside of the given instructions."

Figure 14:
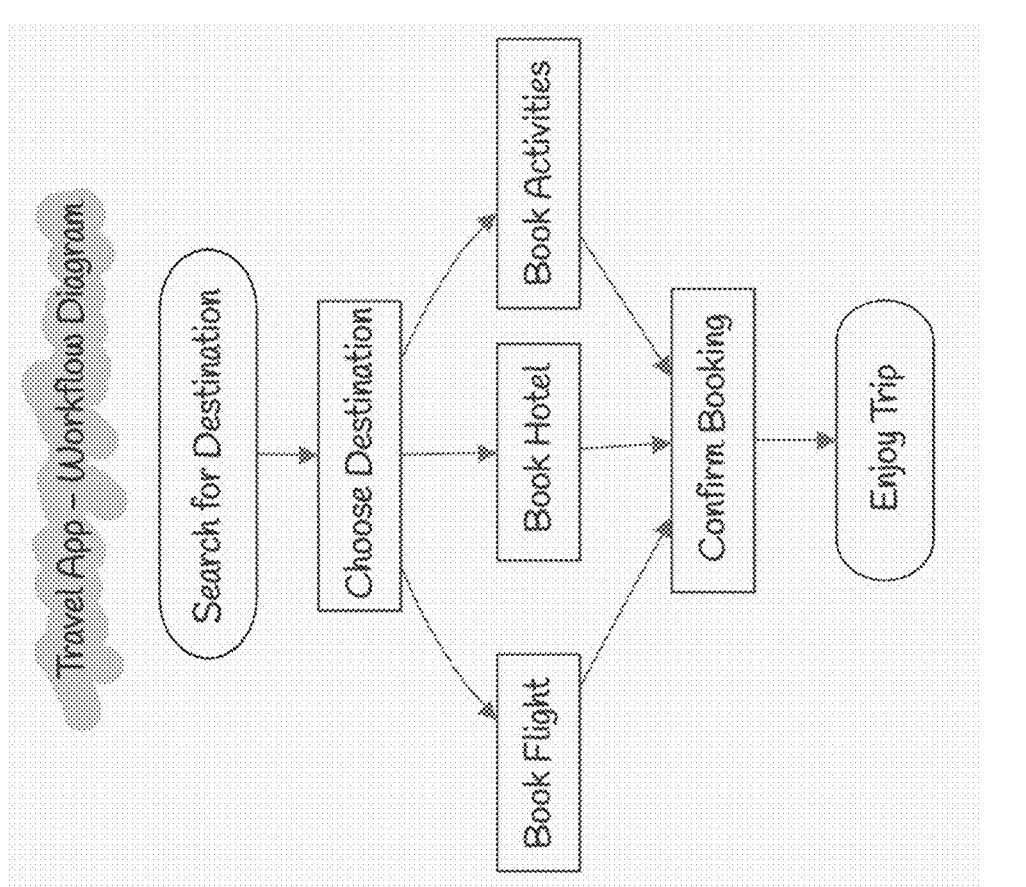
FIG. 14 illustrates an example dynamic diagram layout, according to some embodiments.

FIG. 14 illustrates an example dynamic diagram layout, which is generated based on a JSON file in the disclosed DDDS system (details of the JSON file are not shown). The example diagram is a travel app-workflow diagram, which includes a series of nodes, and connections between these nodes.

According to some embodiments, a JSON file (not shown) may define a graph, with the "n" key specifying a list of nodes and the "x" key specifying a list of edges/connections between those nodes. Each node may be represented as a list with three elements: an integer representing the node's ID, a first string representing the node's label, and a second string representing an emoji symbol for the node (e.g. in this case, it's a Flowchart/Workflow diagram, and start, action, end these are the different components of the type of diagram). An edge may be represented as lists with two elements: the IDs of the nodes that the edge connects (such as source ID and target ID).

To create a diagram from a JSON file, a user may iterate through the nodes and edges, adding a visual representation of each node and edge to the diagram according to the information provided in the JSON file. For example, the user may create a node for each element in the "n" list, using the ID, label, and emoji symbol to create a node with a unique identifier, a descriptive label, and an appropriate symbol. Similarly, one may create an edge for each element in the "x" list, using the IDs to connect the appropriate nodes.

Referring now to FIG. 15, an example method 1500 for generating a visual display in response to a user request is described. As illustrated, method 1500 includes receiving a user input initiated by a user on a canvas of the drawing or art software application at 1501. The user input may include a request for creating a text or non-text object on the canvas (for example, for an ongoing drawing or art project). The method 1500 further includes detecting a presence of one of a predefined set of commands in the user input at step 1503. Method 1500 further includes determining one or more of a type, subject, and content for a to-be-created object by examining the detected command and one or more words before the detected command at 1505. Method 1500 further includes automatically creating the text or non-text object corresponding to the determined one or more of a type, subject, and content at step 1507. The text or non-text object may be created without requiring the user to select a text or drawing tool from tool sections of the drawing or art software application. Method 1500 further includes automatically displaying the created text or non-text object on the canvas in response to the user input requesting for creating the text or non-text object at step 1509.

In some embodiments, the detected command is automatically removed when displaying the created text or non-text object on the canvas.

In some embodiments, the predefined set of commands include a first subset of commands, each defined through a forward slash "" " followed by one or more alphanumeric keys.

In some embodiments, the predefined set of commands include a second subset of commands that further include user-defined preset of prompts including user inputs for the commands, each prompt defined through a hash symbol "#" followed by one or more alphanumeric keys.

In some embodiments, the predefined set of commands include a subset of commands each defining a specific shape to be placed around the one or more words before the detected command.

In some embodiments, the subset of commands defining a shape cause the shape to be placed as empty when there is no word before the detected command.

In some embodiments, the predefined set of commands include a subset of commands each defining a specific connector to be placed next to the one or more words before the detected command.

In some embodiments, the predefined set of commands include a subset of commands each defining an icon or image to be placed on top a word of the one or more words before the detected command.

In some embodiments, the predefined set of commands include a subset of commands each defining an emoji to replace a word of the one or more words before the detected command.

In some embodiments, the predefined set of commands include a subset of commands each defining a conversion of the one or more words before the detected command into one or more sticky notes.

In some embodiments, the predefined set of commands include a subset of commands each defining a coloring of the one or more words before the detected command to a specific color.

In some embodiments, determining a type, subject, and content for a to-be-created object includes determining the type of the to-be-created object by detecting a "type" word included in the user input; determining the subject of the to-be-created object by looking for a "subject" word before the "type" word; and determining the content of the to-be-created object by concatenating words other than the "type" word and "subject" word included in the user input.

In some embodiments, automatically creating the text or non-text object, the executable instructions include acquiring an artificial intelligence (AI) response generated by an AI engine coupled to the disclosed system.

In some embodiments, the AI response is converted into a formatted dataset.

In some embodiments, the method further includes layouting the formatted dataset on the canvas based on the determined type of the to-be-created text or non-text object.

In some embodiments, the determined type of the to-be-created text or non-text object is one of a text type, template type, diagram type, a wireframe type, or a file type.

In some embodiments, a layout corresponding to the template type is one of a single-row layout, a multi-row layout, a star layout, or a multi-grid layout.

In some embodiments, the present disclosure further provides a system for manipulating visual effects in a drawing or art software application. The system includes a processor; and a memory, coupled to the processor, configured to store executable instructions that, when executed by the processor, cause the processor to implement various above-described methods. Such a system is further described in detail in FIG. 16.

FIG. 16 illustrates an example system 1600 that, generally, includes an example computing device 1602 that is representative of one or more computing systems and/or devices that may implement the various techniques described herein (e.g., for transforming AI response into a formatted dataset for visual display). The computing device 1602 may be, for example, a server (e.g., an on-site text input server 101) of a service provider, a device associated with a client (e.g., a client device 103), an on-chip system, and/or any other suitable computing device or computing system.

The example computing device 1602 as illustrated includes a processing system 1604, one or more computer-readable media 1606, and one or more I/O interface 1608 that are communicatively coupled, one to another. Although not shown, the computing device 1602 may further include a system bus or other data and command transfer system that couples the various components, from one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1604 is representative of the functionality to perform one or more operations using hardware. Accordingly, the processing system 1604 is illustrated as including hardware element 1610 that may be configured as processors, functional blocks, and so forth. This may include implementation in hardware as an application-specific integrated circuit (ASIC) or other logic devices formed using one or more semiconductors. The hardware elements 1610 are not limited by the materials from which they are formed, or the processing mechanisms employed therein. For example, processors may be comprised of semiconductor(s) and/or transistors, e.g., electronic integrated circuits (ICs). In such a context, processor-executable instructions may be electronically executable instructions.

The computer-readable storage media 1606 is illustrated as including memory/storage 1612. The memory/storage 1612 represents memory/storage capacity associated with one or more computer-readable media. The memory/storage component 1612 may include volatile media (such as random-access memory (RAM)) and/or nonvolatile media (such as read-only memory (ROM), Flash memory, optical disks, magnetic disks, and so forth). The memory/storage component 1612 may include fixed media (e.g., RAM, ROM, a fixed hard drive, and so on) as well as removable media, e.g., Flash memory, a removable hard drive, an optical disc, and so forth. The computer-readable media 1606 may be configured in a variety of other ways as further described below.

Input/output interface(s) 1608 are representative of functionality to allow a user to enter commands and information to computing device 1602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movements as gestures that do not involve touch), and so forth. Examples of output devices include a display device (e.g., a monitor or projector), speakers, a printer, a network card, a tactile-response device, and so forth. Thus, the computing device 1602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal-bearing media. The computer-readable storage media includes hardware such as volatile and non-volatile, removable and non-re-movable media and/or storage devices implemented in a method or technology suitable for storage of information such as computer-readable instructions, data structures, pro-gram modules, logic elements/circuits, or other data. Examples of computer-readable storage media may include but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage devices, tangible media, or article of manufacture suitable to store the desired information and which may be accessed by a com-puter.

"Computer-readable signal media" may refer to a signal-bearing medium that is configured to transmit instructions to the hardware of the computing device 1602, such as via a network. Signal media typically may embody computer-readable instructions, data structures, program modules, or other data in a modulated data signal, such as carrier waves, data signals, or other transport mechanisms. Signal media also includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1610 and computer-readable media 1606 are representative of mod-ules, programmable device logic and/or fixed device logic implemented in a hardware form that may be employed in one or more implementations to implement at least some aspects of the techniques described herein, such as to perform one or more instructions. Hardware may include components of an integrated circuit or on-chip system, an ASIC, a field-programmable gate array (FPGA), a complex programmable logic device (CPLD), and other implemen-tations in silicon or other hardware. In this context, hardware may operate as a processing device that performs program tasks defined by instructions and/or logic embodied by the hardware as well as hardware utilized to store instructions for execution, e.g., the computer-readable storage media described previously.

Combinations of the foregoing may also be employed to implement various techniques described herein. Accord-ingly, software, hardware, or executable modules may be implemented as one or more instructions and/or logic embodied on some form of computer-readable storage media and/or by one or more hardware elements 1610. The computing device 1602 may be configured to implement particular instructions and/or functions corresponding to the software and/or hardware modules. Accordingly, implemen-tation of a module that is executable by the computing device 1602 as software may be achieved at least partially in hardware, e.g., through the use of computer-readable storage media and/or hardware elements 1610 of the processing system 1604. The instructions and/or functions may be executable/operable by one or more articles of manufacture (for example, one or more computing devices 1602 and/or processing systems 1604) to implement techniques, mod-ules, and examples described herein.

As further illustrated in FIG. 16, the example system 1600 enables ubiquitous environments for a seamless user expe-rience when running applications on a personal computer (PC), a television device, and/or a mobile device. Services and applications run substantially similar in all three envi-ronments for a common user experience when transitioning from one device to the next while utilizing an application, playing a video game, watching a video, and so on.

In the example system 1600, multiple devices are inter-connected through a central computing device. The central computing device may be local to the multiple devices or may be located remotely from the multiple devices. In one implementation, the central computing device may be a cloud of one or more server computers that are connected to the multiple devices through a network, the Internet, or other data communication link.

In one implementation, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one implementation, a class of target devices is created, and experiences are tailored to the generic class of devices. A class of devices may be defined by physical features, types of usage, or other common characteristics of the devices.

In various implementations, the computing device 1602 may assume a variety of different configurations, such as for computer 1614, mobile 1616, and television 1618 uses. Each of these configurations includes devices that may have generally different constructs and capabilities, and thus the computing device 1602 may be configured according to one or more of the different device classes. For instance, the computing device 1602 may be implemented as the com-puter 1614 class of a device that includes a personal com-puter, desktop computer, multi-screen computer, laptop computer, netbook, and so on.

The computing device 1602 may also be implemented as the mobile 1616 class of device that includes mobile devices, such as a mobile phone, portable music player, portable gaming device, a tablet computer, a multi-screen computer, and so on. The computing device 1602 may also be implemented as the television 1618 class of device that includes devices having or connected to generally larger screens in casual viewing environments. These devices include televisions, set-top boxes, gaming consoles, and so on.

The techniques described herein may be supported by these various configurations of the computing device 1602 and are not limited to the specific examples of the techniques described herein. This is illustrated through the inclusion of the smart art and design application 105 on the computing device 1602. The functionality represented by the smart art and design application 105 and other modules/applications may also be implemented all or in part through the use of a distributed system, such as over a "cloud" 1620 via a platform 1622 as described below.

The cloud 1620 includes and/or is representative of a platform 1622 for resources 1624. The platform 1622 abstracts the underlying functionality of hardware (e.g., servers) and software resources of the cloud 1620. The resources 1624 may include applications and/or data that can be utilized while computer processing is executed on servers that are remote from the computing device 1602. Resources 1624 can also include services provided over the Internet and/or through a subscriber network, such as a cellular or Wi-Fi network.

The platform 1622 may abstract resources and functions to connect the computing device 1602 with other computing devices. The platform 1622 may also serve to abstract scaling of resources to provide a corresponding level of scale to encountered demand for the resources 1624 that are implemented via the platform 1622. Accordingly, in an interconnected device implementation, implementation of functionality described herein may be distributed throughout the system 1600. For example, the functionality may be implemented in part on the computing device 1602 as well as via the platform 1622 which abstracts the functionality of the cloud 1620.

Although the techniques have been described in language specific to structural features and/or methodological acts, it is to be understood that the subject matter defined in the appended claims is not necessarily limited to the specific features or acts described. Rather, the specific features and acts are disclosed as example forms of implementing the claimed subject matter, and other equivalent features and methods are intended to be within the scope of the appended claims. Further, various different implementations are described, and it is to be appreciated that each described implementation can be implemented independently or in connection with one or more other described implementations.

What is claimed is:

1. A system for manipulating visual effects in a drawing or art software application, the system comprising:
   a processor; and
   a memory, coupled to the processor, configured to store executable instructions that, when executed by the processor, cause the processor to:
   receive a user input initiated by a user on a canvas of the drawing or art software application, the user input including a request for creating a text or non-text object;
   detect a presence of one of a predefined set of commands in the user input;
   determine one or more of a type, subject, and content for a to-be-created object by examining the detected command and one or more words before the detected command; and
   automatically create the text or non-text object corresponding to the determined one or more of the type, subject, and content without requiring the user to select a text or drawing tool from tool sections of the drawing or art software application,
   wherein the text or non-text object is automatically created by:
   acquiring an artificial intelligence (AI) response generated by an AI engine coupled to the system;
   converting the AI response into a formatted dataset; and
   layouting the formatted dataset on the canvas based on the determined type of the to-be-created object,
   wherein the determined type of the to-be-created object is one of a text type, template type, diagram type, a wireframe type, or a file type, and a layout corresponding to the template type is one of a single-row layout, a multi-row layout, a star layout, or a multi-grid layout.

2. The system of claim 1, wherein the executable instructions further include instructions that, when executed by the processor, cause the processor to:
   automatically remove the detected command input by the user when layouting the formatted dataset on the canvas.

3. The system of claim 1, wherein the predefined set of commands comprise a first subset of commands, each defined through a forward slash "/" followed by one or more alphanumeric keys.

4. The system of claim 1, wherein the predefined set of commands comprise a second subset of commands that further include user-defined preset of prompts including user inputs for the commands, each prompt defined through a hash symbol "#" followed by one or more alphanumeric keys.

5. The system of claim 1, wherein the predefined set of commands comprise a subset of commands each defining a specific shape to be placed around the one or more words before the detected command.

6. The system of claim 5, wherein the subset of commands defining a shape cause the shape to be placed as empty when there is no word before the detected command.

7. The system of claim 1, wherein the predefined set of commands comprise a subset of commands each defining a specific connector to be placed next to the one or more words before the detected command.

8. The system of claim 1, wherein the predefined set of commands comprise a subset of commands each defining an icon or image to be placed on top of a word of the one or more words before the detected command.

9. The system of claim 1, wherein the predefined set of commands comprise a subset of commands each defining an emoji to replace a word of the one or more words before the detected command.

10. The system of claim 1, wherein the predefined set of commands comprise a subset of commands each defining a conversion of the one or more words before the detected command into one or more sticky notes.

11. The system of claim 1, wherein the predefined set of commands comprise a subset of commands each defining a coloring of the one or more words before the detected command to a specific color.

12. The system of claim 1, wherein, to determine a type, subject, and content for a to-be-created object, the executable instructions further include instructions that, when executed by the processor, cause the processor to:
   determine the type of the to-be-created object by detecting a "type" word included in the user input;
   determine the subject of the to-be-created object by looking for a "subject" word before the "type" word; and
   determine the content of the to-be-created object by concatenating words other than the "type" word and "subject" word included in the user input.

13. A method for manipulating visual effects in a drawing or art software application, comprising:
   receiving a user input initiated by a user on a canvas of the drawing or art software application, the user input including a request for creating a text or non-text object;
   detecting a presence of one of a predefined set of commands in the user input;
   determining one or more of a type, subject, and content for a to-be-created object by examining the detected command and one or more words before the detected command; and
   automatically creating the text or non-text object corresponding to the determined one or more of a type, subject, and content without requiring the user to select a text or drawing tool from tool sections of the drawing or art software application, wherein automatically creating the text or non-text object includes:

acquiring an artificial intelligence (AI) response generated by an AI engine coupled to the system;

converting the AI response into a formatted dataset; and layouting the formatted dataset on the canvas based on the determined type of the to-be-created object, wherein the determined type of the to-be-created object is one of a text type, template type, diagram type, a wireframe type, or a file type, and a layout corresponding to the template type is one of a single-row layout, a multi-row layout, a star layout, or a multi-grid layout.

14. The method of claim 13, wherein the detected command is automatically removed when layouting the formatted dataset on the canvas.

* * * * *